(12) United States Patent
Hiltner et al.

(10) Patent No.: US 7,272,473 B2
(45) Date of Patent: Sep. 18, 2007

(54) METHODS AND SYSTEMS FOR ANALYZING SYSTEM OPERATOR COUPLING SUSCEPTIBILITY

(75) Inventors: Dale W. Hiltner, Seattle, WA (US); Brian P. Lee, Seattle, WA (US)

(73) Assignee: The Boeing Company, Chicago, IL (US)

(*) Notice: Subject to any disclaimer, the term of this patent is extended or adjusted under 35 U.S.C. 154(b) by 224 days.

(21) Appl. No.: 10/944,128

(22) Filed: Sep. 17, 2004

(65) Prior Publication Data

US 2006/0064207 A1    Mar. 23, 2006

(51) Int. Cl.
*G05D 1/00* (2006.01)
*B64D 43/02* (2006.01)

(52) U.S. Cl. ............................................ 701/9; 701/14
(58) Field of Classification Search ................... 701/3, 701/8, 14
See application file for complete search history.

(56) References Cited

U.S. PATENT DOCUMENTS

| | | | |
|---|---|---|---|
| 3,473,407 A | 10/1969 | Hicks | |
| 3,748,749 A | 7/1973 | Buscher et al. | |
| 4,004,537 A | 1/1977 | Nilsson | |
| 4,092,716 A * | 5/1978 | Berg et al. .................. 701/3 |
| 4,142,699 A | 3/1979 | Arnquist et al. | |
| 4,171,115 A * | 10/1979 | Osder .......................... 244/181 |
| 4,236,685 A * | 12/1980 | Kissel .......................... 244/223 |
| 4,287,788 A | 9/1981 | Baetke | |
| 4,318,308 A | 3/1982 | Monteillet | |
| 4,382,281 A | 5/1983 | Fowler | |
| 4,705,236 A | 11/1987 | Rudolph | |
| 4,762,294 A | 8/1988 | Carl | |
| 4,776,543 A | 10/1988 | Stableford | |
| 4,793,576 A | 12/1988 | Frerk | |
| 5,000,404 A * | 3/1991 | Martorella .................. 244/188 |

(Continued)

OTHER PUBLICATIONS

Aviation Safety and Pilot Control, Understanding and Preventing Unfavorable Pilot-Vehicle Interactions, Commitee on the Effects of Aircraft-Pilot Coupling on Flight Safety, Aeronautics and Space Engineering Board, Commission on Engineering and Technical Systems, National Research Council, 1997, 220 pgs, National Academy Press, Washington DC.

(Continued)

*Primary Examiner*—Jack Keith
*Assistant Examiner*—Ari M. Diacou
(74) *Attorney, Agent, or Firm*—Perkins Coie LLP

(57) ABSTRACT

Methods for analyzing system operator coupling susceptibility are described herein. In one embodiment, an open loop frequency response can be compared to a related over-steer point. An over-steer point can be the condition where, as operator gain is increased for an open loop system, the corresponding closed loop gain at a corresponding resonance peak increases by at least approximately the same amount as the increase in operator gain or at least approximately a selected larger amount than the increase in operator gain. In other embodiments, an open loop frequency response can be compared to a critical gain rate. The critical gain rate can be the rate of change of open loop gain per open loop phase angle of the corresponding open loop system response at an over-steer point that is associated with a zero decibel closed loop gain.

66 Claims, 21 Drawing Sheets

U.S. PATENT DOCUMENTS

| | | | |
|---|---|---|---|
| 5,050,086 A | 9/1991 | Lambregts | |
| 5,076,517 A | 12/1991 | Ferranti | |
| 5,136,518 A * | 8/1992 | Glover | 701/5 |
| 5,165,240 A * | 11/1992 | Page et al. | 60/719 |
| 5,291,113 A | 3/1994 | Hegg | |
| 5,456,428 A | 10/1995 | Hegg | |
| 5,489,830 A | 2/1996 | Fernandez | |
| 5,528,119 A * | 6/1996 | Rundqwist et al. | 318/632 |
| 5,538,209 A | 7/1996 | Bowden | |
| 5,646,854 A * | 7/1997 | Bevan | 701/206 |
| 5,669,582 A | 9/1997 | Bryant | |
| 5,797,564 A | 8/1998 | Cartmell | |
| 5,806,806 A | 9/1998 | Boehringer | |
| 5,839,697 A | 11/1998 | Tran | |
| 5,868,359 A | 2/1999 | Cartmell | |
| 5,904,724 A * | 5/1999 | Margolin | 701/120 |
| 5,935,177 A * | 8/1999 | Cox et al. | 701/9 |
| 6,005,513 A * | 12/1999 | Hardesty | 342/357.09 |
| 6,041,273 A * | 3/2000 | Burken et al. | 701/3 |
| 6,128,554 A * | 10/2000 | Damotte | 701/4 |
| 6,173,218 B1 * | 1/2001 | Vian | 701/1 |
| 6,189,836 B1 * | 2/2001 | Gold et al. | 244/191 |
| 6,199,028 B1 * | 3/2001 | Repperger et al. | 702/189 |
| 6,354,274 B1 * | 3/2002 | Shima et al. | 123/478 |
| 6,459,228 B1 | 10/2002 | Szulyk | |
| 6,574,533 B2 * | 6/2003 | Godard et al. | 701/3 |
| 6,675,076 B1 | 1/2004 | Moody | |
| 2003/0088342 A1 * | 5/2003 | Godard et al. | 701/3 |
| 2004/0078120 A1 * | 4/2004 | Melkers et al. | 701/3 |
| 2004/0098176 A1 * | 5/2004 | Raimbault et al. | 701/3 |
| 2005/0021193 A1 * | 1/2005 | Raimbault et al. | 701/4 |
| 2005/0085957 A1 * | 4/2005 | Yeh | 701/3 |

OTHER PUBLICATIONS

Duus, Gunnar, "SCARLET 3—A Flight Experiment Considering Rate Saturation," AIAAA 2000-3987, AIAA Atmospheric Flight Mechanics Conference and Exhibit, Aug. 14-17, 2000, Denver Colorado, pp. 1-10.

Gibson, J.C., "Developement of a methodology for excellence in handling qualities design for fly by wire aircraft," 1999, pp. 138-176, Delft University Press, The Netherlands.

Gilbreath, Gregory P., "A Limited Flight Test Evaluation of a Pilot-Induced-Oscillation Prediction Criterion," AIAA Atmospheric Flight Mechanics Conference and Exhibit, Aug. 6-9, 2001, Montreal Canada, 11 pgs.

Hess, R.A., "Unified Theory for Aircraft Handling Qualities and Adverse Aircraft-Pilot Coupling," Nov.-Dec. 1997, 8 pgs, Journal of Guidance, Control and Dynamics, vol. 30, No. 6.

McRuer, Duane T., "Pilot-Induced Oscillations and Human Dynamic Behavior," NASA contractor Report 4683, Jul. 1995, Subcontract TSD-93-STI-2806, 102 pgs.

Ogata, Katsuhiko, "Modern Control Engineering," 1970, pp. 440-451, Prentice-Hall, Inc., Englewood Cliffs, NJ.

Robbins, Andrew C., "Pilot Variability During Pilot-Induced Oscillation," Jun. 18, 1999, p. 1-64, Virginia Polytechnic Institute and State University.

* cited by examiner

METHODS AND SYSTEMS FOR ANALYZING SYSTEM OPERATOR COUPLING SUSCEPTIBILITY

TECHNICAL FIELD

Embodiments of the present invention relate to methods for analyzing system operator coupling susceptibility, for example, aircraft pilot coupling (APC) susceptibility.

BACKGROUND

Any control system having an operator interface can be susceptible to the operator coupling with the system while the operator is operating or controlling the system. For example, the response characteristics of the system can cause the operator to make inputs that are too large (e.g., over-controlling) and/or out of phase with the system response when attempting to operate or control the system during certain tasks. When the system includes an aircraft, this phenomenon often results in unwanted aircraft motion resulting from the pilot's control input and is referred to as an aircraft pilot coupling (APC) event. When the unwanted aircraft motion is oscillatory in nature, the APC event is often referred to as pilot-induced oscillation (PIO). APC events can degrade aircraft handling qualities and/or lead to aircraft control problems.

Over the years, aircraft designers have developed different criteria to predict the APC susceptibility of different designs. These criteria have included the bandwidth criterion, the Gibson criterion, the Open Loop Onset Parameter criterion, the Smith-Geddes criterion, the Neal-Smith criterion, and the Hess criterion. Although some of these criteria examine both the frequency and gain of the system, in many cases, they do not yield the desired accuracy and/or provide the desired insight into system performance. Additionally, many of these criteria are cumbersome, complex, and difficult to use.

SUMMARY

The present invention is directed generally toward methods for analyzing system operator coupling susceptibility, for example APC and/or PIO susceptibility. One aspect of the invention is directed toward a method for evaluating the susceptibility of a system to operator coupling that includes providing data relationships for multiple over-steer points. Each over-steer point can be the condition where, as the operator gain is increased for a corresponding open loop system, the corresponding closed loop gain at a corresponding resonance peak increases by at least approximately the same amount as the increase in operator gain or at least approximately a selected larger amount than the increase in operator gain. Each of the data relationships can include a corresponding open loop phase angle, open loop gain, and gain rate. The gain rate can be the rate of change of open loop gain per open loop phase angle of the corresponding open loop system response at the over-steer point.

The method can further include providing a selected open loop frequency response. The method can still further include determining if the selected open loop frequency response has at least one open loop phase angle where a gain rate of the selected open loop frequency response is at least approximately equal to the gain rate of one of the data relationships at the corresponding open loop phase angle. If there is at least one open loop phase angle where a gain rate of the selected open loop frequency response is at least approximately equal to the gain rate of one of the data relationships, the method can still further include finding the at least one open loop phase angle where the gain rate of the selected open loop frequency response is at least approximately equal to the gain rate of one of the data relationships.

Another aspect is directed toward a method for evaluating the susceptibility of a system to operator coupling that includes providing a critical gain rate. The critical gain rate can be the rate of change of open loop gain per open loop phase angle for an open loop system response having an over-steer point with a closed loop gain at least approximately equal to zero decibels. The method can further include determining if a selected open loop frequency response has at least one phase angle where the gain rate of the selected open loop frequency response is less than the critical gain rate. If a selected open loop frequency response has at least one phase angle where the gain rate of the selected open loop frequency response is less than the critical gain rate, the method can further include finding the at least one open loop phase angle where the gain rate of the selected open loop frequency response is less than the critical gain rate.

Yet another aspect is directed toward a method for evaluating the susceptibility of a system to operator coupling that includes providing an open loop frequency response having a selected operator gain. The method can further include determining if there is at least one operator gain for the open loop frequency response that provides at least one over-steer point. The over-steer point can be the condition where, as the operator gain is increased for the open loop frequency response, the corresponding closed loop gain at a corresponding resonance peak increases by at least approximately the same amount as the increase in operator gain or at least approximately a selected larger amount than the increase in operator gain. If there is at least one over-steer point, the method can further include determining an open loop phase angle associated with the at least one over-steer point. In certain embodiments, the method can still further include determining an open loop gain at the at least one over-steer point, and determining an open loop gain of the open loop frequency response, having the selected operator gain, at the open loop phase angle associated with the at least one over-steer point.

BRIEF DESCRIPTION OF THE DRAWINGS

The following drawings are included for illustrative purposes only.

DETAILED DESCRIPTION

The present disclosure describes methods for analyzing system operator coupling susceptibility, for example, APC and/or PIO susceptibility. Several specific details of the invention are set forth in the following description and in FIGS. 1-18C to provide a thorough understanding of certain embodiments of the invention. One skilled in the art, however, will understand that the present invention may have additional embodiments, and that other embodiments of the invention may be practiced without several of the specific features described below. Additionally, although aspects of the invention are discussed in the context of an aircraft system, embodiments of the invention can be applied to various other operator-controlled systems to identify the susceptibility of operator system coupling.

Figure 1:
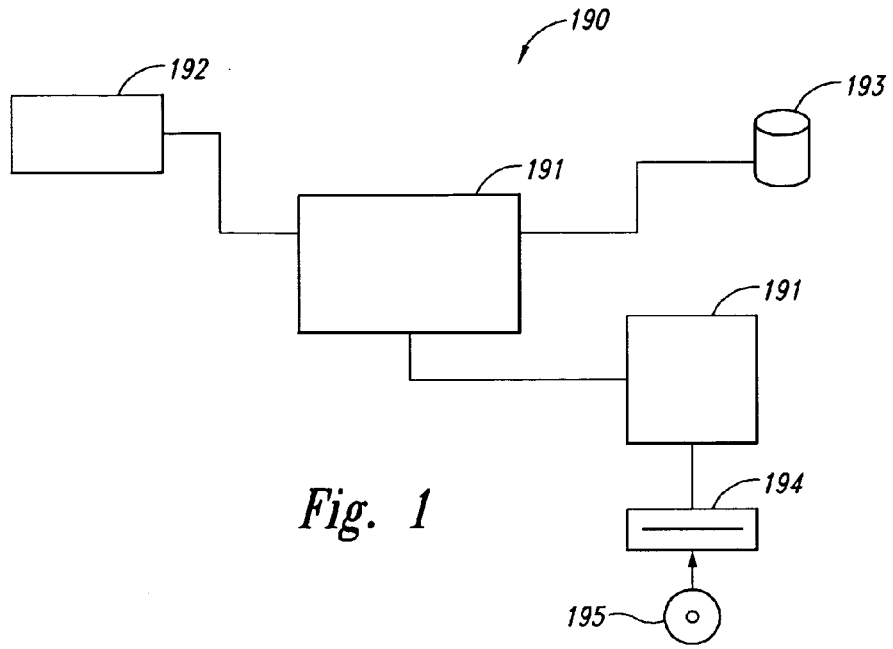
FIG. 1 is a partially schematic illustration of a computing system and a computer-readable medium, in accordance with an embodiment of the invention.

Many embodiments of the invention described below may take the form of computer-executable instructions, such as routines executed by a programmable computer (e.g., a personal computer). Those skilled in the relevant art will appreciate that the invention can be practiced on other computer system configurations as well. The invention can be embodied in a special-purpose computer or data processor that is specifically programmed, configured or constructed to form one or more of the computer-executable instructions described below. Accordingly, the term "computing system" as generally used herein, includes any processor (or group of processors) and can include internet appliances, handheld devices (including palm-top computers, wearable computers, cellular or mobile phones, multi-processor systems, processor-based or programmable consumer electronics, mini-computers and the like). An example of a computing system 190 is shown in FIG. 1, and includes at least one processor 191 (two are shown), a memory 192, a database 193, and a device 194 for reading a computer-readable medium 195.

The invention can also be practiced and distributed in computing environments, where tasks or modules are performed by remote processing devices that are linked through a communications network. In a distributed computing environment, program modules or subroutines may be located in both local and remote memory storage devices, aspects of the invention described below may be stored or distributed on computer-readable media, including magnetic or optical readable computer disk (e.g., removable disks), as well as distributed electronically over networks. Data structures and transmission of data particular to aspects of the invention are also encompassed within the scope of the invention.

A predominant cause of operator system coupling (e.g., aircraft pilot coupling) includes poor system response predictability (e.g., poor aircraft predictability). For example, when an aircraft response to a pilot input differs from the pilot's expectation, the pilot is forced to compensate (e.g., make another control input or change the control inputs that the pilot makes) to obtain the desired aircraft response. One example of predictability problems can be seen in systems that have large time delays between the pilot input and the time that the pilot sees an aircraft response. Another example can be seen when the aircraft response is inconsistent and/or non-linear for varying control inputs (e.g., the aircraft response increases nonlinearly as the magnitude of the pilot input is increased). The present invention allows the aircraft designer to analyze the open loop frequency response of the aircraft and anticipate these types of predictability problems in relationship to both frequency and gain.

Figure 2A:
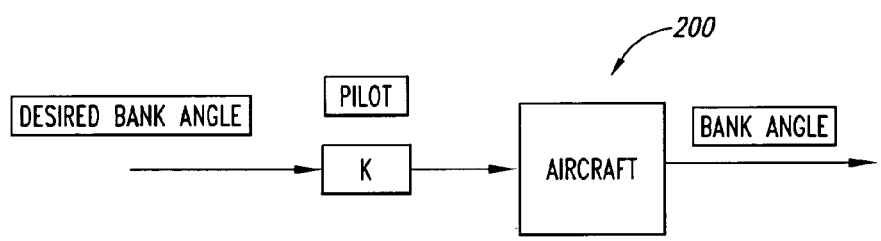
FIG. 2A is a schematic illustration of an open loop system, in accordance with an embodiment of the invention.
Figure 2B:
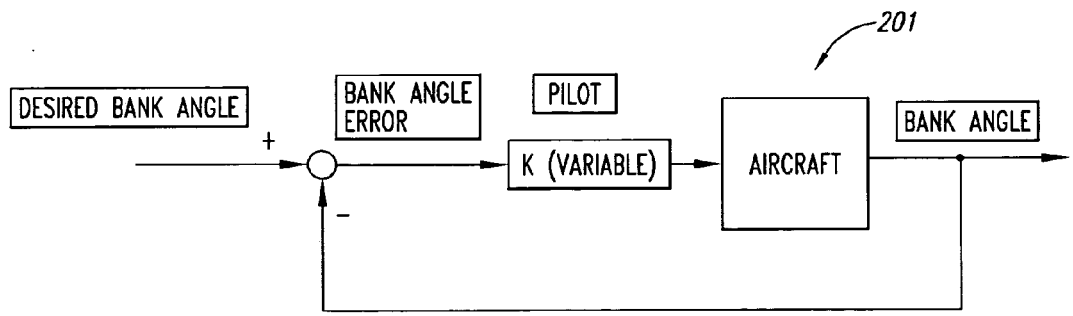
FIG. 2B is a schematic illustration of a closed loop system, in accordance with an embodiment of the invention.

In analyzing an aircraft design, the piloted aircraft system is often represented in block diagram form. FIG. 2A is a block diagram illustration of an open loop aircraft system 200. In FIG. 2A, the pilot, represented by at least an operator gain K, makes an input (e.g., an input that the pilot believes will provide a selected bank angle or roll rate) and the aircraft responds (e.g., with some bank angle or roll rate). FIG. 2B is an illustration of a block diagram of a closed loop aircraft system 201 where the pilot makes an input (e.g., to achieve a desired bank angle or roll rate), observes the response of the aircraft (e.g., the resulting bank angle or roll rate), determines an error value between the desired response and the actual response (if one exists), and makes an adjustment (e.g., another control input), if necessary, to achieve the desired response. When an adjustment is needed, a pilot will respond differently to a selected error value depending on the phase of flight and/or differently to different error values. For example, a pilot can respond with a different magnitude of control input and/or rapidness of the control application for a selected error value during a landing phase of flight than the pilot uses during cruise. Additionally, different pilots can respond differently to the same error value in the same flight condition. Accordingly, in the closed loop aircraft system 201 the pilot is represented as a variable operator gain K (e.g., an operator that makes variable inputs of variable amplitude).

Figure 3:
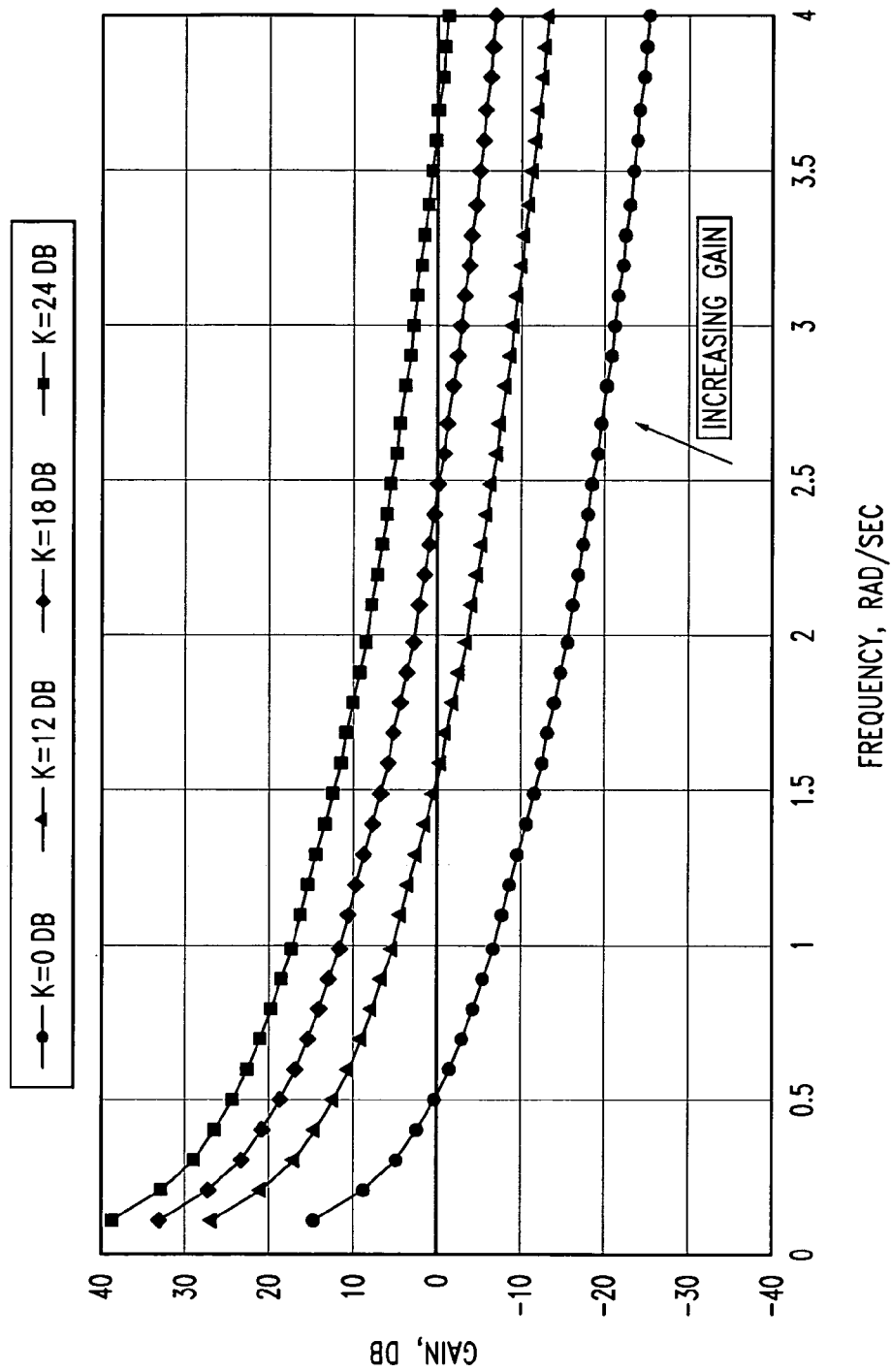
FIG. 3 is a schematic illustration of a gain versus frequency plot of open loop frequency responses having various operator gains, in accordance with an embodiment of the invention.

As shown in FIG. 3, the operator gain K generally acts as a gain multiplier for the open loop system response. In some cases, the basic frequency response can be obtained from a known transfer function. In other cases, the basic frequency response can be obtained by having a pilot perform a constant magnitude frequency sweep of the relevant aircraft control and measuring the aircraft response. For example, the pilot can slowly move an input control stick laterally plus or minus one inch about the neutral position in a cyclic manner increasing the cyclic frequency over a selected period of time. The pilot input and aircraft response can be measured over this time period and reduced using various methods (e.g., a lower order equivalent systems analysis and/or a fast fourier transform analysis) to produce an open loop frequency response of open loop gain versus frequency as shown in FIG. 3. As shown in FIG. 3, as the pilot or operator gain K (e.g., the amplitude of the input) is increased, the rate of change of gain per frequency (e.g., slope) can remain at least approximately constant, however, the open loop system gain can increase for a selected frequency value. This provides a graphic illustration of how operator gain K can act as a gain multiplier for the open loop system.

Figure 4:
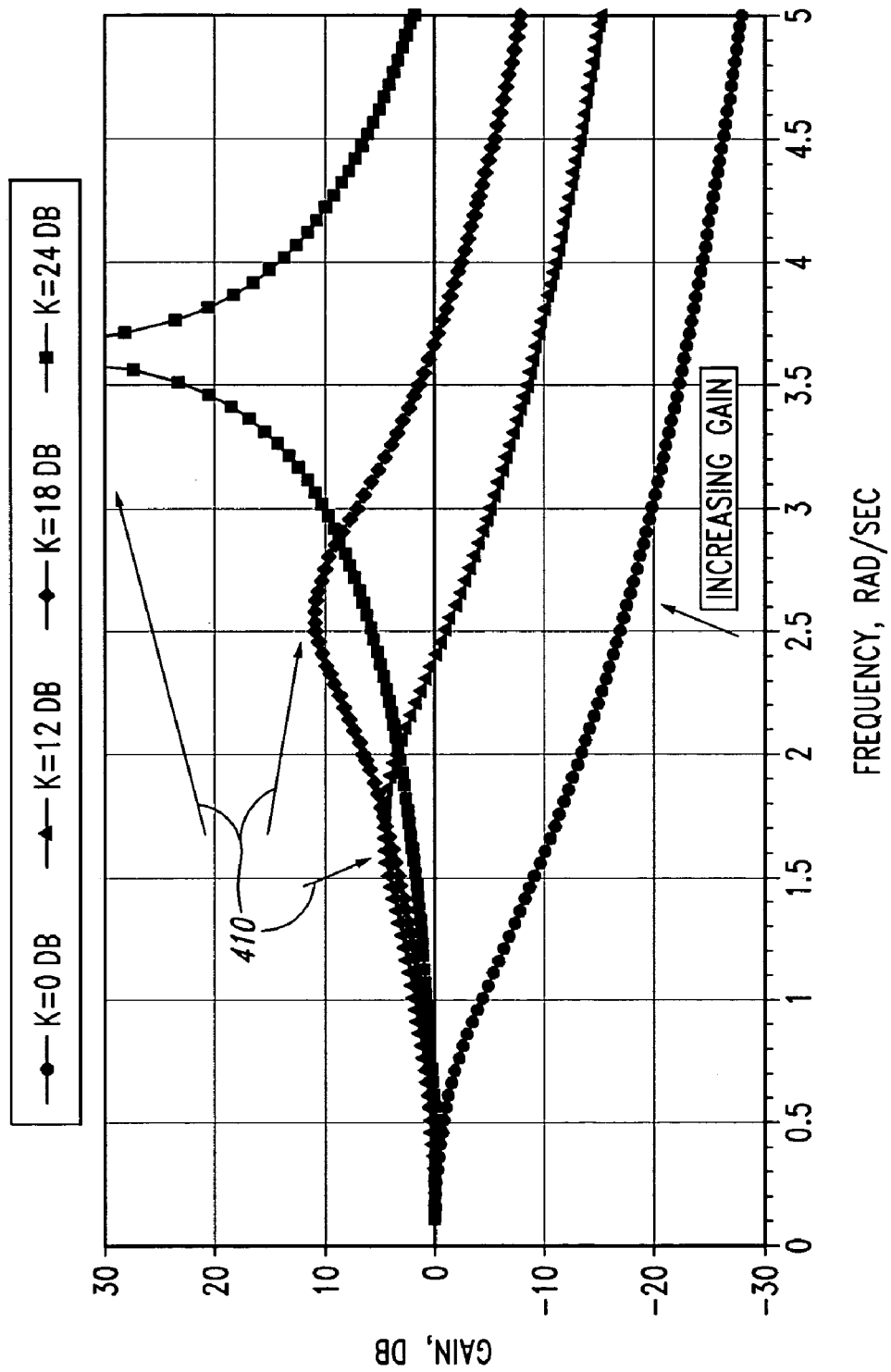
FIG. 4 is a schematic illustration of a gain versus frequency plot of closed loop frequency responses having various operator gains, in accordance with an embodiment of the invention.

As illustrated in FIG. 4, operator gain K can have a different effect on the closed loop frequency response of the system. FIG. 4 shows the closed loop frequency responses for the same system that yielded the open loop frequency responses shown in FIG. 3. As seen in FIG. 4, different operator gains K change the shape (e.g., slope) of the closed loop frequency response. For example, most operator gains K yield a closed loop frequency response where closed loop gain increases and then decreases with increasing frequency.

For each frequency response, the point where the gain stops increasing and begins to decrease is called the resonance peak 410. The resonance peak 410 is related to the natural damped frequency of the closed loop system. As the pilot does a constant magnitude frequency sweep, the resonance peak 410 will be generally seen as the frequency where the aircraft response is largest for the constant magnitude input.

As shown in FIG. 4, as the operator or pilot gain K (e.g., the magnitude of the pilot input) increases, the resonance peaks 410 occur at different closed loop gains and frequencies. As the pilot or operator gain K (expressed in decibels) is increased incrementally, a point will be reached where the incremental increase in closed loop gain (expressed in decibels) for the corresponding resonance peak 410 will begin to increase at least approximately faster than the pilot or operator gain K (expressed in decibels) is increased (e.g., the closed loop gain increases at least approximately the same amount as the operator gain K is increased). This condition can be defined as the over-steer point. In other embodiments, depending on various factors (e.g., operator characteristics, system characteristics, and the operating environment in which the system operates), it can be desirable to define the over-steer point as a point where, as the operator gain K is increased incrementally, the incremental increase in closed loop gain for the corresponding resonance peak 410 begins to increase by at least approximately a selected larger amount than the operator gain K is increased. As pilot gain K is further increased beyond the gain associated with the defined over-steer point, the predictability of the aircraft can decrease. This decrease in system predictability can lead to an APC/PIO event. Although many of the illustrated embodiments discussed below are directed toward finding and/or using an over-steer point where, as the operator gain K is increased incrementally, the closed loop gain for the corresponding resonance peak 410 increases at least approximately the same amount as the operator gain K is increased, it will be understood by those skilled in the art that these techniques are equally applicable to determining and/or using an over-steer point that is defined as being where, as the operator gain K is increased incrementally, the closed loop gain for the corresponding resonance peak 410 increases at least approximately a selected larger amount than the operator gain K is increased.

For example, as the pilot increases pilot gain, an over-steer point will be reached and the pilot will continue to increase pilot gain expecting a generally linear increase in aircraft response; however, the aircraft response can become non-linear and accordingly the pilot's expectations are not met. In many cases, if the pilot does not compensate for this phenomena (e.g., reduce the pilot gain), the pilot will continue to increase pilot gain until an APC or PIO event occurs (e.g., the pilot can increase pilot gain to the point where the pilot is 180 degrees out of phase with the aircraft response). Accordingly, the pilot or operator gain associated with the over-steer point for a given system can provide valuable insight into APC/PIO susceptibility.

Figure 5:
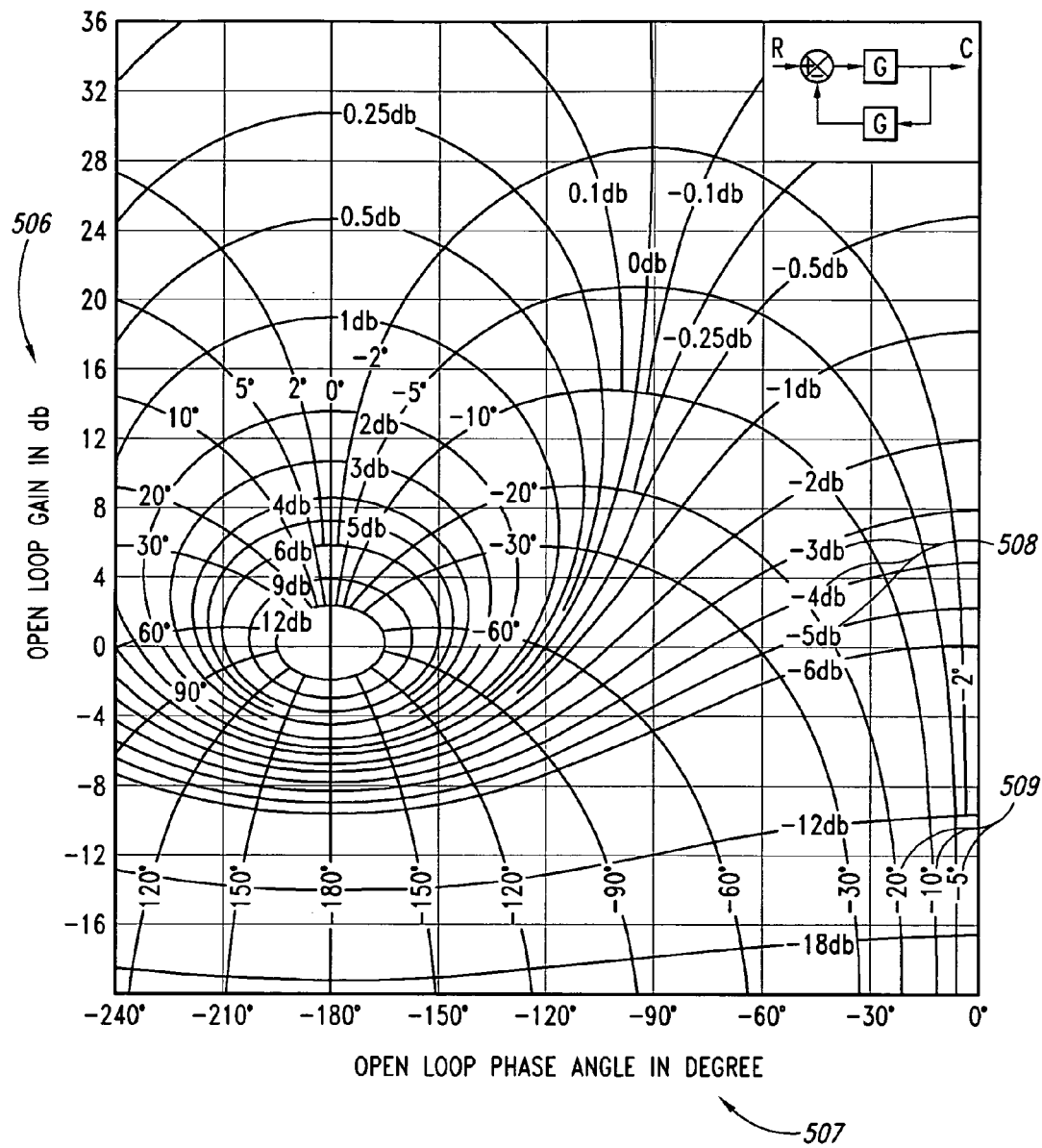
FIG. 5 is a schematic illustration of a Nichols chart, in accordance with an embodiment of the invention.

The relationship between the open loop frequency response, shown in FIG. 3, and the closed loop frequency response, shown in FIG. 4, can be shown using various methods. For example, FIG. 5 is an example of a Nichols chart used to relate open loop gain 506 and open loop phase angle 507 of an open loop frequency response to the associated closed loop gain 508 and closed loop phase angle 509 when the feedback loop is closed on the system. Nichols charts are available in many control theory textbooks, for example, a Nichols chart is presented in K. Ogata, *Modern Control Engineering,* 1970.

Figure 6:
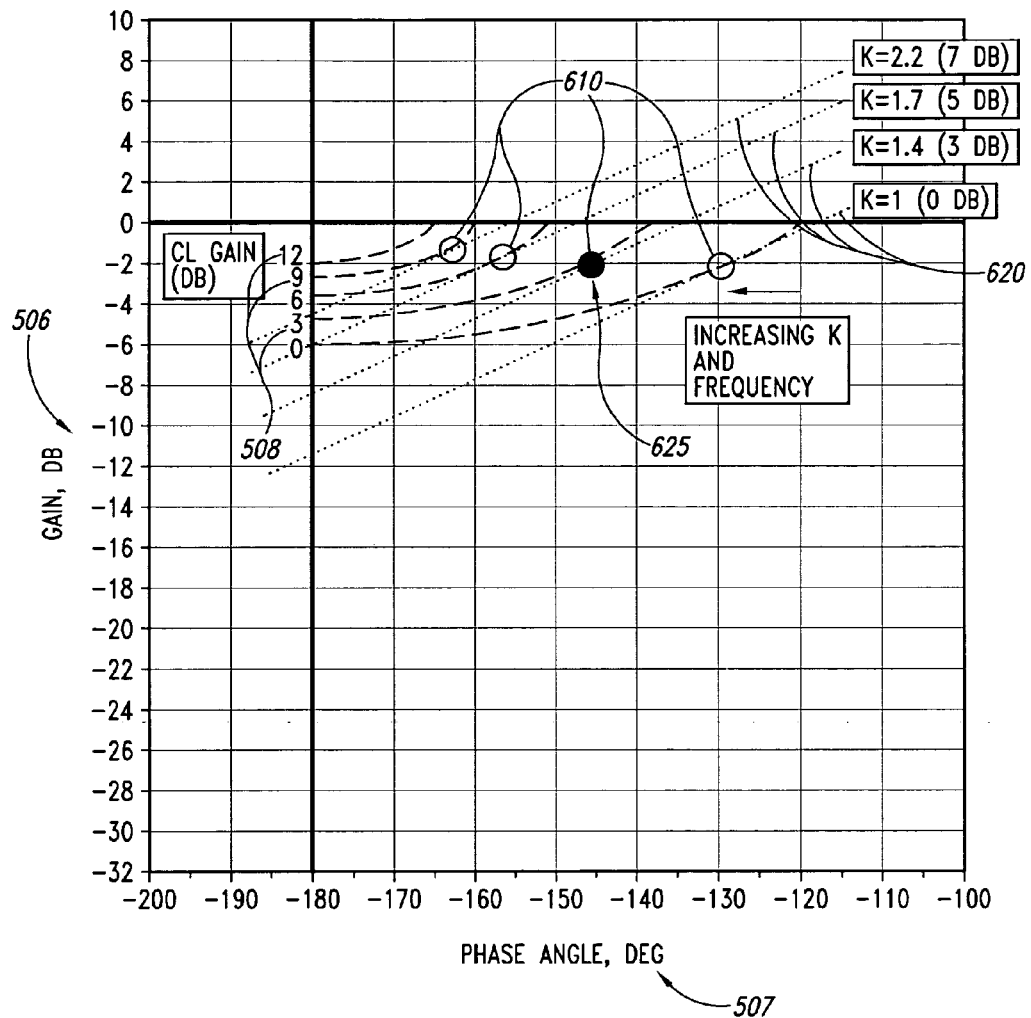
FIG. 6 is a schematic illustration of a Nichols chart showing multiple resonance peaks and an over-steer point for a selected system, in accordance with an embodiment of the invention.

FIG. 6 illustrates a portion of the Nichols chart shown in FIG. 5 with open loop frequency responses 620 plotted on the chart. The open loop responses are for a selected open loop system, but each frequency response has a different operator gain K. As the operator or pilot gain K increases, the frequency responses 620 retain at least approximately the same gain rate (e.g., rate of change of gain per phase angle) or slope, however, the plotted frequency responses 620 are shifted upwardly. The resonance peak 610 for a selected operator gain K occurs when the corresponding frequency response 620 for the selected operator gain K is tangent to a line of constant closed loop gain 508. This is the largest closed loop gain 508 associated with the frequency response of the selected system, having the operator gain K, for a selected range of phase angles. The resonance peak occurs at a corresponding open loop phase angle and open loop gain. Additionally, at the tangent point, both the local slope of the corresponding line of constant closed loop gain 508 and the local slope of the open loop frequency response 620 have the same slope. As discussed above, this slope represents a gain rate.

As the operator gain K is increased further, the frequency responses 620 continue to shift upwardly and numerous resonance peaks 610 are identified. Additionally, as operator gain K is increased, a condition will be reached where the incremental increase in closed loop gain 508 between resonance peaks is greater than the corresponding incremental increase in operator gain K. As discussed above, this identifies an over-steer point 625 for the selected control system. As seen in FIG. 6, an over-steer point for a selected control system occurs at a specific operator gain K, a specific open loop phase angle 507, a specific open loop gain 506, and a specific closed loop gain 508. Additionally, at the over-steer point there will be a corresponding gain rate (slope) associated with the local portion of the open loop frequency response 620 and the local portion of the associated line of constant closed loop gain 508. A data relationship for the over-steer point can include any combination of these parameters.

Figure 7:
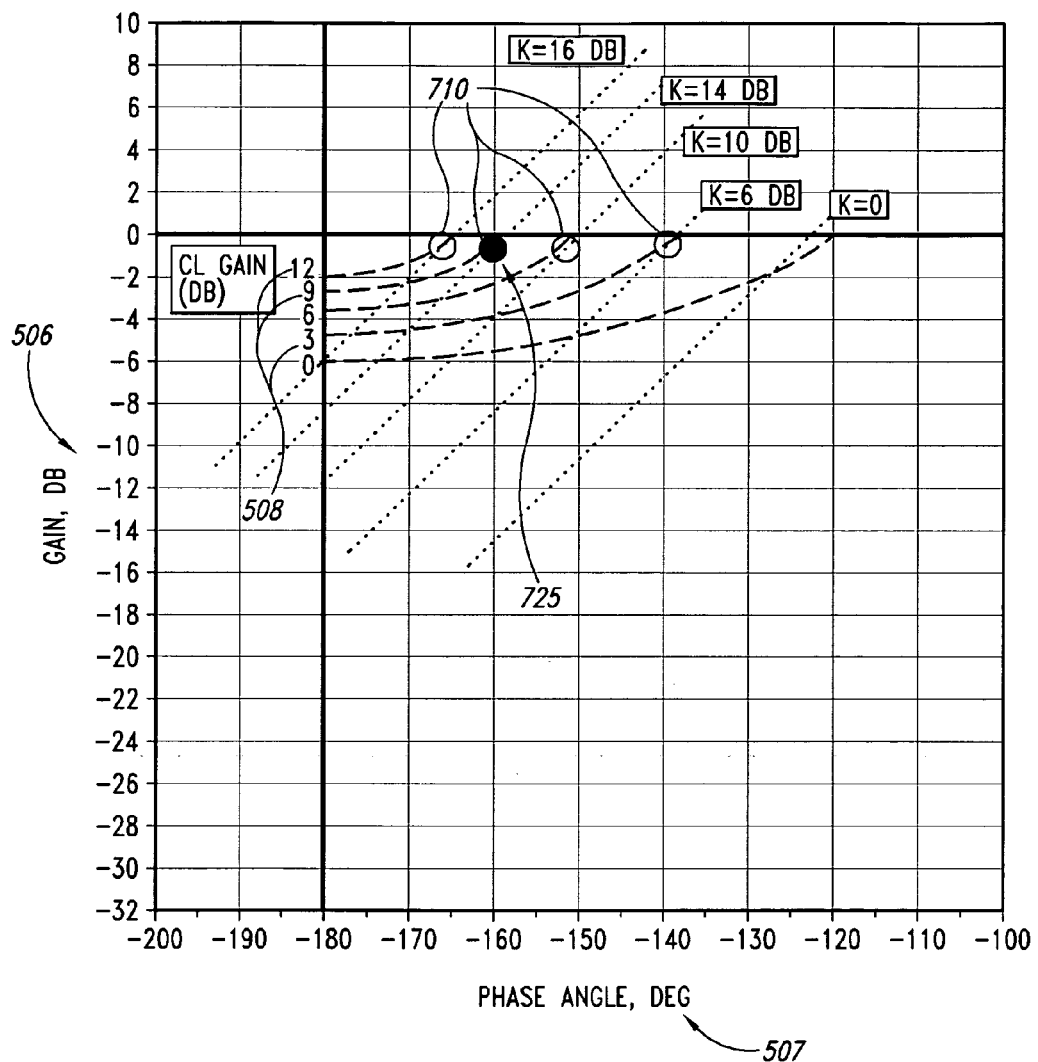
FIG. 7 is a schematic illustration of a Nichols chart showing multiple resonance peaks and an over-steer point for a selected system, different from the system shown in FIG. 6, in accordance with an embodiment of the invention.

Some frequency responses can have multiple resonance peaks and in some cases multiple over-steer points that occur over different ranges of phase angles 507 (e.g., when the open loop frequency response includes multiple segments with significantly different gain rates or slopes). However, each resonance peak 610 and over-steer point 625 will have a corresponding operator gain K, open loop phase angle 507, open loop gain 506, closed loop gain 508, and associated gain rate. Additionally, other systems will have open loop frequency responses that have different gain rates or slopes and will yield different over-steer points as operator gain K is varied. Accordingly, multiple systems having differing open loop frequency responses can be used to find multiple over-steer points, with each over-steer point having different data relationships. The data relationship for each of these over-steer points can be determined and stored. For example, FIG. 7 illustrates another open loop system, having a different gain rate or slope, being used to determine an over-steer point 725 by varying the operator gain K. As shown in FIG. 7, the different gain rate yields resonance peaks 710 different from those shown in FIG. 6 and results in a different over-steer point 725, having a different data relationship.

Multiple data relationships for multiple over-steer points can be stored and compared to a selected open loop frequency response (with a selected operator gain) to determine the relative susceptibility to APC/PIO of a corresponding selected system. For example, if a gain rate and open loop phase angle combination of the selected system are at least approximately equal to the gain rate and open loop phase angle of a data relationship corresponding to an over-steer point, the designer can determine how much the open loop gain of the selected system would have to increase for the selected system to yield a frequency response that passes through the over-steer point. As discussed above, because the operator gain acts as a gain multiplier this can provide the designer an indication of how much the operator gain can increase before the selected system reaches an over-steer point. For example, in FIG. 7, the frequency response having an operator gain K of six decibels has the same slope or gain rate as the frequency response that passes through the over-steer point, which has an operator gain of fourteen decibels. Accordingly, the operator gain K can be increased to fourteen decibels before the system will reach an over-steer point.

Figure 8:
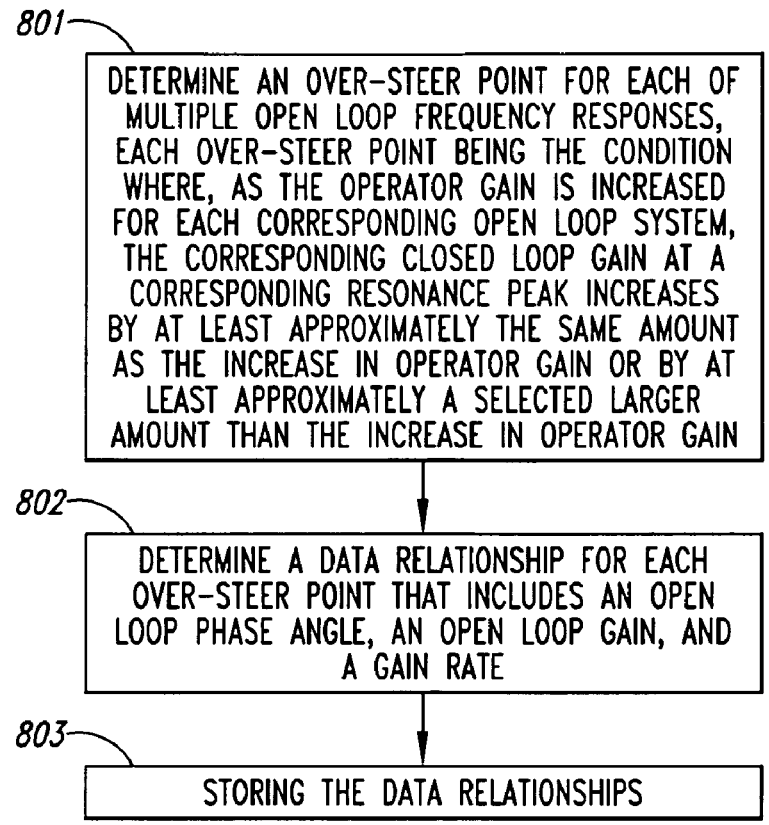
FIG. 8 is a schematic illustration of a process for providing/determining data relationships, in accordance with an embodiment of the invention.

As illustrated in FIG. 8, one embodiment of the invention is directed toward a process of providing or determining the data relationships. The process includes determining an over-steer point for each of multiple open loop frequency responses, each over-steer point being the condition where, as the operator gain is increased for each corresponding open loop system, the corresponding closed loop gain at a corresponding resonance peak increases by at least approximately the same amount as the increase in operator gain or at least approximately a selected larger amount than the increase in operator gain (process portion 801). The process can further include determining a data relationship for each over-steer point that includes an open loop phase angle, an open loop gain, and a gain rate (process portion 802). The process can still further include storing the data relationships (process portion 803). The data relationships can be stored in any form, including in tabular form, in graphical form, in the form of one or more equations, in/on a computer-readable media, and/or in a computing system (e.g., a memory, a database, and/or a registry).

In many cases, data relationships for over-steer points with corresponding closed loop gains that are equal to or less than zero decibels deserve additional consideration. These data relationships are associated with low gain rates, and can generally be difficult to analyze and/or can generally manifest undesirable characteristics with regard to operator coupling (e.g., a sluggish control response). For example, when the closed loop gain at an over-steer point is less than zero decibels, the system's closed loop response is attenuated (e.g., the output is less than the input) and, while the system response may be sluggish, in many cases the operator can compensate for the resulting predictability problems associated with the over-steer point. However, if the operator further increases the operator gain K to a value where there is amplification (e.g., the output is greater than the input), the operator's ability to compensate for the predictability problems can be reduced or eliminated. Accordingly, it can be useful to determine a critical gain rate (e.g., the gain rate associated with an over-steer point where the closed loop gain is at least approximately equal to zero decibels) so that this critical gain rate can be compared with selected open loop frequency responses.

Figure 9:
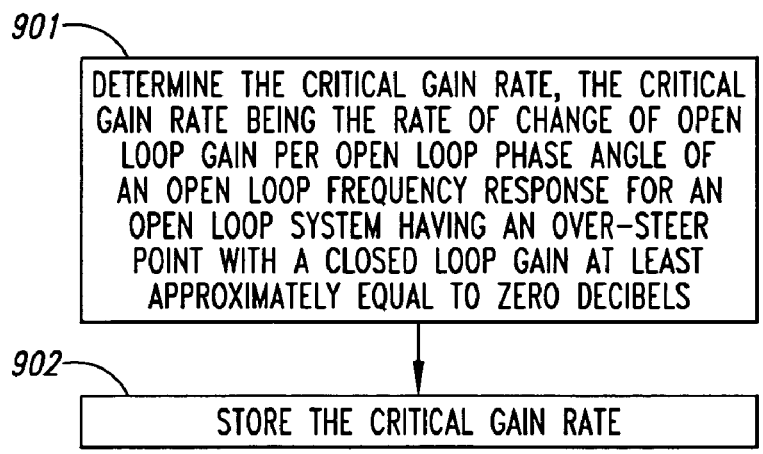
FIG. 9 is a schematic illustration of a process for providing/determining a critical gain rate, in accordance with another embodiment of the invention.

Therefore, as shown in FIG. 9, another embodiment of the invention is directed toward a method for providing and/or developing data associated with a critical gain rate. The method can include determining a critical gain rate (process portion 901). The critical gain rate can be the rate of change of open loop gain per open loop phase angle of an open loop frequency response for an open loop system having an over-steer point with a closed loop gain at least approximately equal to zero decibels. More specifically, the critical gain rate can be the gain rate of the open loop frequency response at the over-steer point of an open loop system where the closed loop gain at the over-steer point is at least approximately equal to zero decibels. The method can further include storing the critical gain rate (process portion 902). Similar to the data relationships discussed above, the critical gain can be stored in any form, including in tabular form, in graphical form, in the form of one or more equations, in/on a computer-readable medium, and/or in a computing system (e.g., a memory, a database, and/or a registry).

Finding data relationships for multiple over-steer points and/or finding a critical gain rate can be accomplished using a variety of methods, and can be accomplished in a variety of manners (e.g., manually, graphically, numerically, and/or by using a computing system). For example, the Nichols chart analysis described above can be accomplished in a various ways, including using graphical techniques and/or by using a computing system.

Figure 10A:
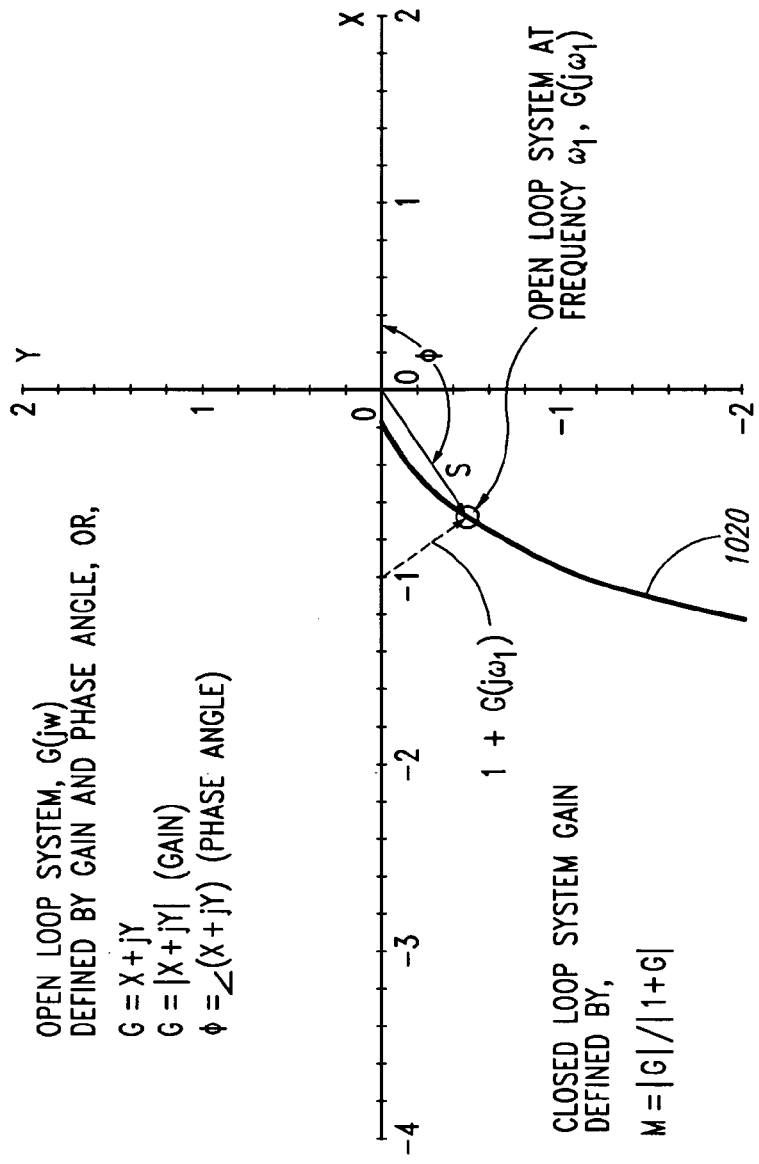
FIG. 10A is a schematic illustration of an open loop frequency response plotted in the complex plane, in accordance with an embodiment of the invention.

In one embodiment, the data relationships and critical gain rate can be determined numerically using a complex plane analysis. FIG. 10A shows a selected open loop frequency response 1020 (with a selected operator gain K) for a selected open loop system $G(j\omega)$ plotted in a complex plane. The open loop gain S can be expressed as $|X+jY|$ (as a pure gain ratio of output/input) and the open loop phase angle $\phi$ can be expressed as $\angle(X+jY)$ (in radians). Assuming unity feedback, the closed loop system $CL(j\omega)$ is equal to $G(j\omega)/(1+G(j\omega))$ and the closed loop system gain M is equal to $|G(j\omega)|/|1+G(j\omega)|$. The term $1+G(j\omega)$ can be defined in the complex plane by the vector from the $-1+j0$ point to the $X+jY$ point of the open loop frequency response. The closed loop gain M can thus be determined by trigonometric and algebraic methods.

Figure 10B:
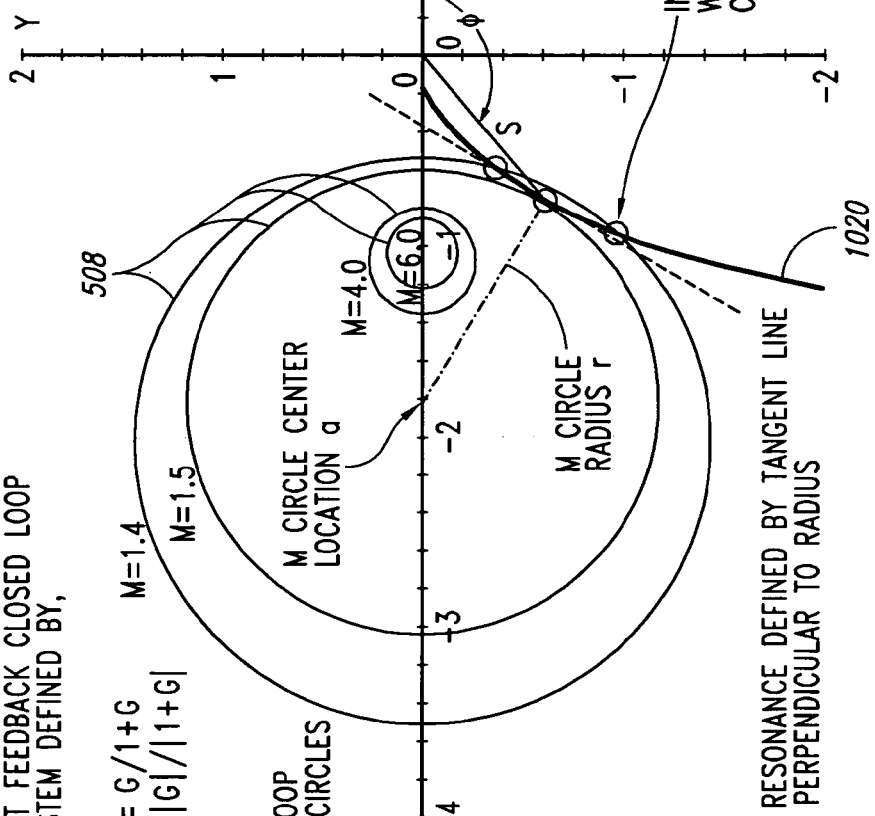
FIG. 10B is a schematic illustration of an open loop frequency response and circle of closed loop gain plotted in the complex plane, in accordance with an embodiment of the invention.

As shown in FIG. 10B, a family of circles in the complex plane can represent lines of constant closed loop gain 508, each having a value M. Each circle has a center at $a+j0$, which is equal to $-M^2/(M^2-1)$, and a radius r, which is equal to $|M/(M^2-1)|$. Each point where the frequency response 1020 is tangent to a circle of constant closed loop gain 508 indicates a resonance peak, discussed above with reference to FIG. 6. Information regarding plotting a frequency response in the complex plain and representing a family of circles of closed loop gain is available in K. Ogata, *Modern Control Engineering*, 1970.

Figure 10C:
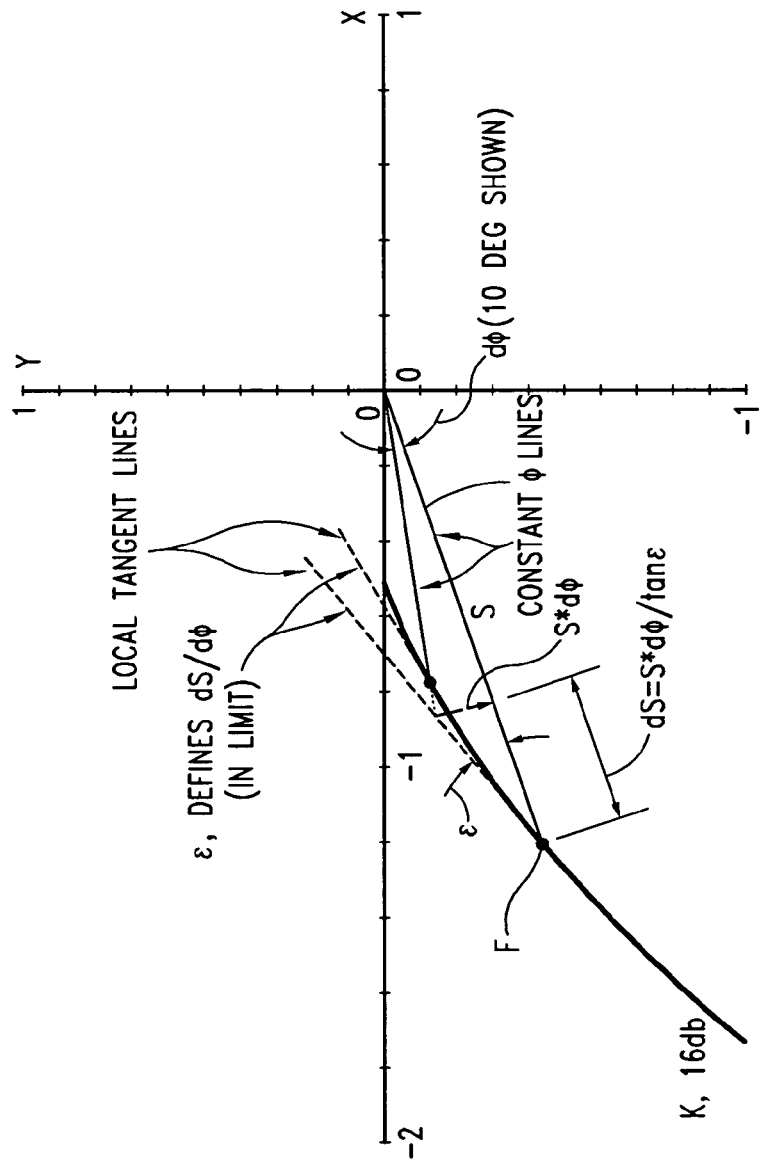
FIG. 10C is a schematic illustration of an open loop frequency response plotted in the complex plane showing a method for determining slope, in accordance with an embodiment of the invention.

As illustrated in FIG. 10C, the local slope or gain rate of the open loop frequency response at a resonance peak can be determined using trigonometry. There is an angle $\epsilon$ between the line tangent to a circle of constant closed loop gain at a tangent point F and a line (having magnitude S) between the tangent point F and the origin. In the limit, the sine of $\epsilon$ of a unit length along the tangent line can be defined by the arc length $S^*d\phi$ and the cosine of the unit length can be defined as dS. Accordingly, in the limit, the $\tan(\epsilon)$ is equal to $S^*d\phi/dS$. Therefore, $dS/d\phi$ (the slope or gain rate associated with the resonance peak) is equal to $S/\tan(\epsilon)$, where $dS/d\phi$ is expressed in gain/radian.

As operator gain is increased for the selected system, the frequency response of the system will generally rotate clockwise and generally stretch out in the complex plane. As the operator gain K is increased, the resulting open loop frequency responses will be tangent to different circles of closed loop gains, and thereby define different resonance peaks. Accordingly, by examination of the resonance peaks, over-steer points corresponding to multiple systems can be identified. Each over-steer point can be associated with a specific operator gain K, a specific open loop phase angle, a specific open loop gain, a specific closed loop gain, and gain rate. As discussed above, data relationships can be identified and stored for each over-steer point.

Figure 10D:
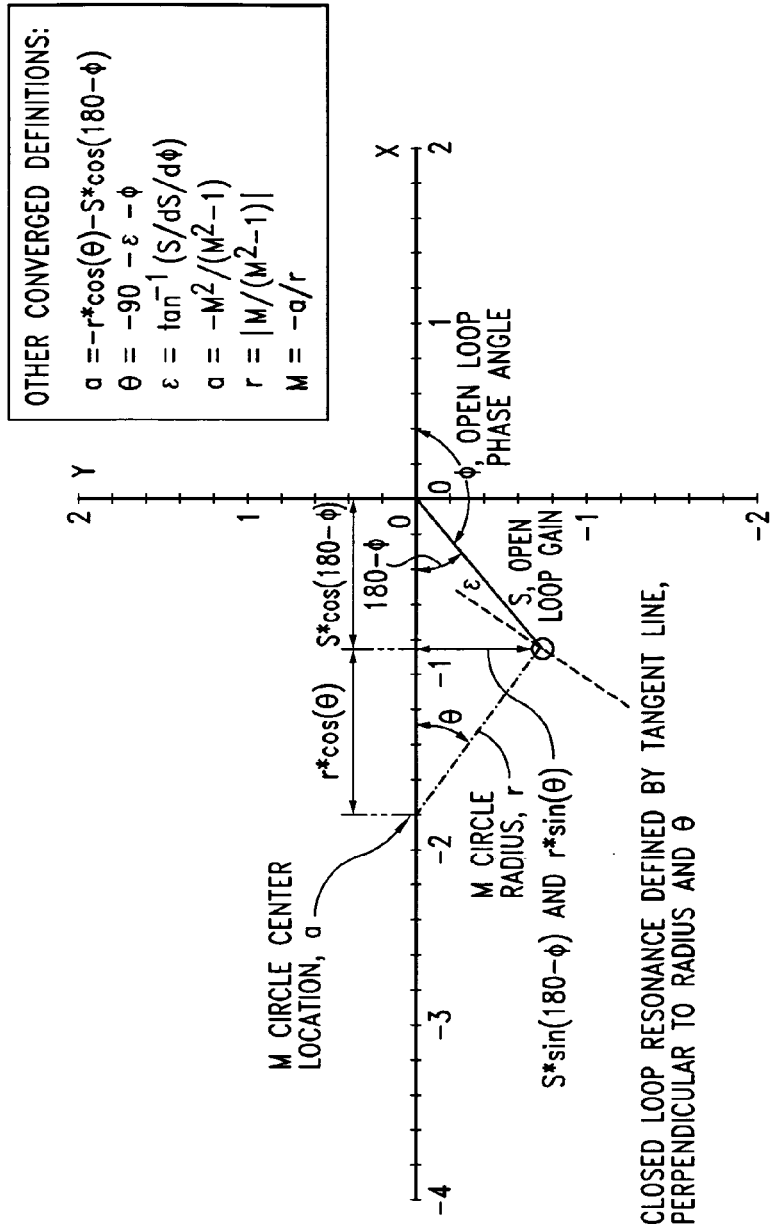
FIG. 10D is a schematic illustration of various trigonometric relationships in the complex plane, in accordance with an embodiment of the invention.
Figure 10E:
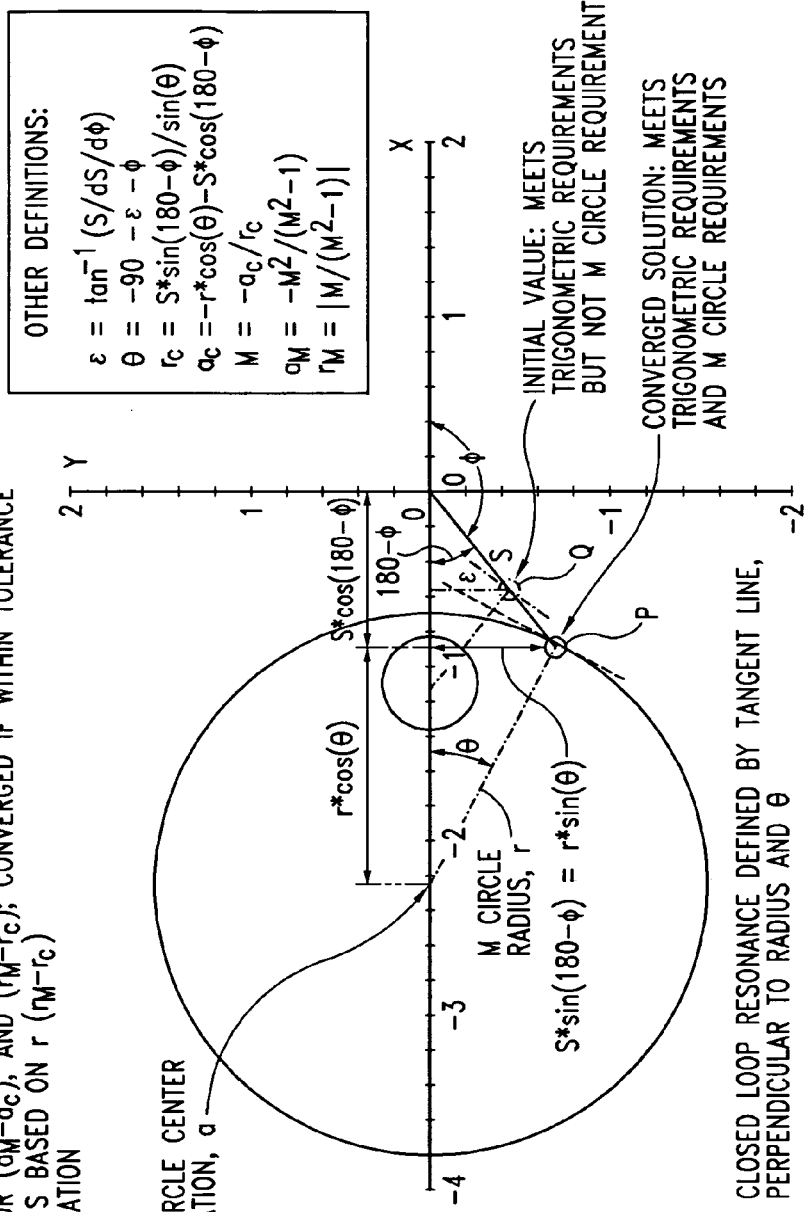
FIG. 10E is a schematic illustration of an iterative process for finding a resonance peak in the complex plane, in accordance with an embodiment of the invention.
Figure 10F:
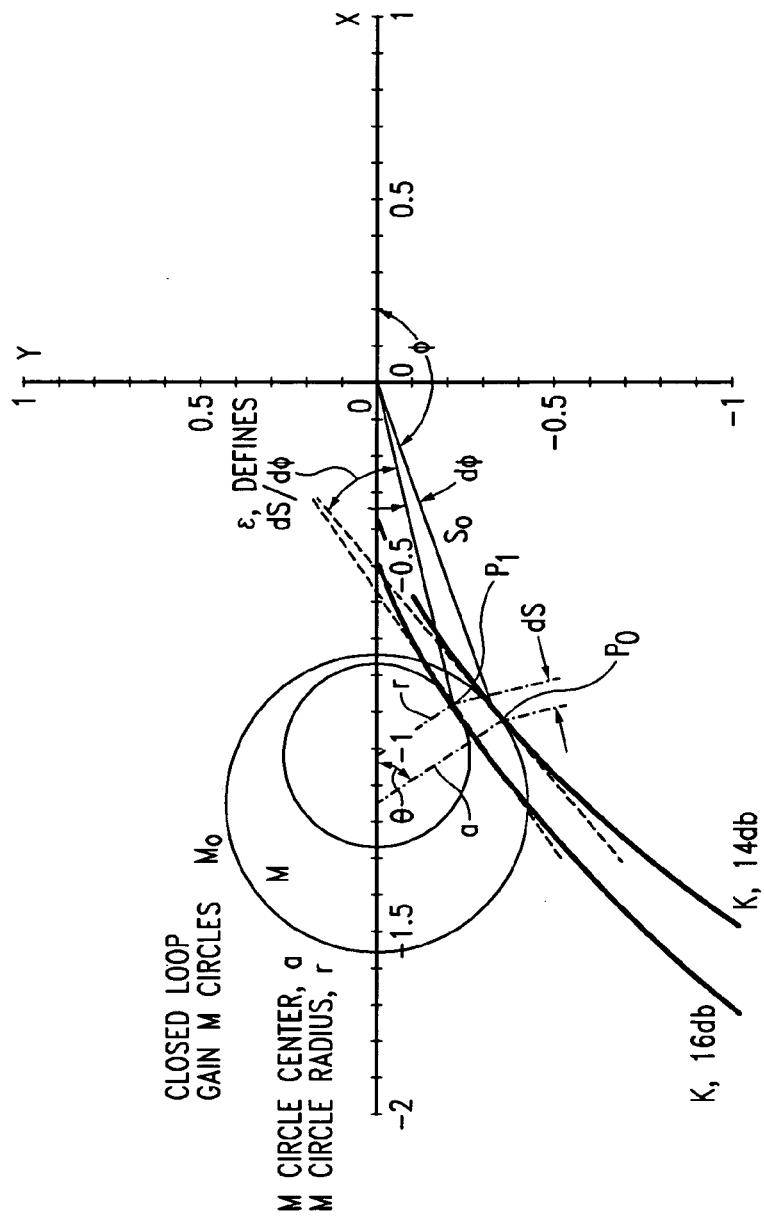
FIG. 10F is a schematic illustration of a process for finding an over-steer point in the complex plane, in accordance with an embodiment of the invention.

One method for calculating multiple over-steer points is illustrated in FIG. 10D-F. FIG. 10D illustrates the geometric/trigonometric relationship between circles of constant closed loop gains and local slopes or gain rates that are tangent to the circles. These relationships can be used to find a resonance peak for a selected phase angle and gain rate associated with a selected system. An iterative process can then be used to vary open loop phase angle and open loop gain until an over-steer condition is identified. In other embodiments, a closed form numerical solution for these equations can be obtained to calculate the resonance peak.

FIG. 10E illustrates an iterative solution that can be used to identify a resonance peak at a selected open loop phase angle and gain rate. The process includes selecting an open loop gain rate $dS/d\phi$, an open loop phase angle $\phi$, and a starting value for open loop gain S. The $\tan^{-1}(S/(dS/d\phi))$ can then be used to compute a value for angle $\epsilon$ between the line tangent to a circle of constant closed loop gain and a line between the tangent point and the origin (discussed above with reference to FIG. 10C).

Using the illustrated geometric relationships, the angle $\epsilon$ can be used to calculate values for the center $a_c$ and radius $r_c$ of the circle of constant closed loop gain M. The equation $M=-a_c/r_c$ can then be used to calculate the closed loop gain M. The calculated closed loop gain M can then be used to compute values for the center location of the circle $a_m$ using the equation $a_m=-M2/(M2-1)$, and the radius of the circle $r_m$, using the equation $r_m=|M/(M2-1)|$. The location of the center of the circle and the radius of the circle calculated from the angle $\epsilon$ and calculated from the open loop gain M can be compared (e.g., using $a_m-a_c$ and $r_m-r_c$). A resonance peak is identified when the errors are within a selected tolerance (e.g., point P in FIG. 10E). If the errors are not within selected tolerances (e.g., point Q in FIG. 10E), the open loop gain S can be adjusted based on the radius error $(r_m-r_c)$.

As illustrated in FIG. 10F, once a resonance peak $(P_0)$ is identified for the selected phase angle $\phi$ and gain rate $dS/d\phi$, an iterative process can be used to find an over-steer point. In FIG. 10F, the open loop phase angle $\phi$ can be incremented a small amount $d\phi$ and a solution for a second resonance peak $(P_1)$ can be obtained using the process described above with reference to FIG. 10E. The associated change in open loop gain S and closed loop gain M between the resonance peak at point $P_0$ and $P_1$ can be compared, by expressing both in terms of decibels. This will require a conversion from pure gain to decibels since the open and closed loop gains are expressed in pure gain in the complex plane. The open loop phase angle $\phi$ can be incremented $(d\phi)$ and the process continued until the corresponding increase in closed loop gain M (expressed in decibels) first exceeds (or is at least equal to) the corresponding increase in open loop gain S (expressed in decibels). This defines an over-steer point.

Multiple over-steer points can be identified using the same process and the corresponding data relationships can be stored for comparison with selected open loop frequency responses. The critical gain rate, discussed above with reference to FIG. 9 can be determined in a similar manner and will be the condition where the over-steer point occurs at a closed loop gain M of at least approximately one (zero decibels). As with the data relationships, the critical gain rate can be stored for comparison to other open loop systems.

Data relationships corresponding to over-steer points can be stored in various manners, including in equation form, in tabular form, graphically, in the form of one or more equations, in/on a computer-readable medium, and/or on a computing system (e.g., a memory, a database, and/or a registry). For example, data relationships determined using the process discussed with reference to FIGS. 10A-F can be plotted and stored on a Nichols chart. In order to plot data relationships on the Nichols chart, gain, phase angle, and gain rate must be expressed in units of decibels, degrees, and decibels per degree respectively.

Figure 11:
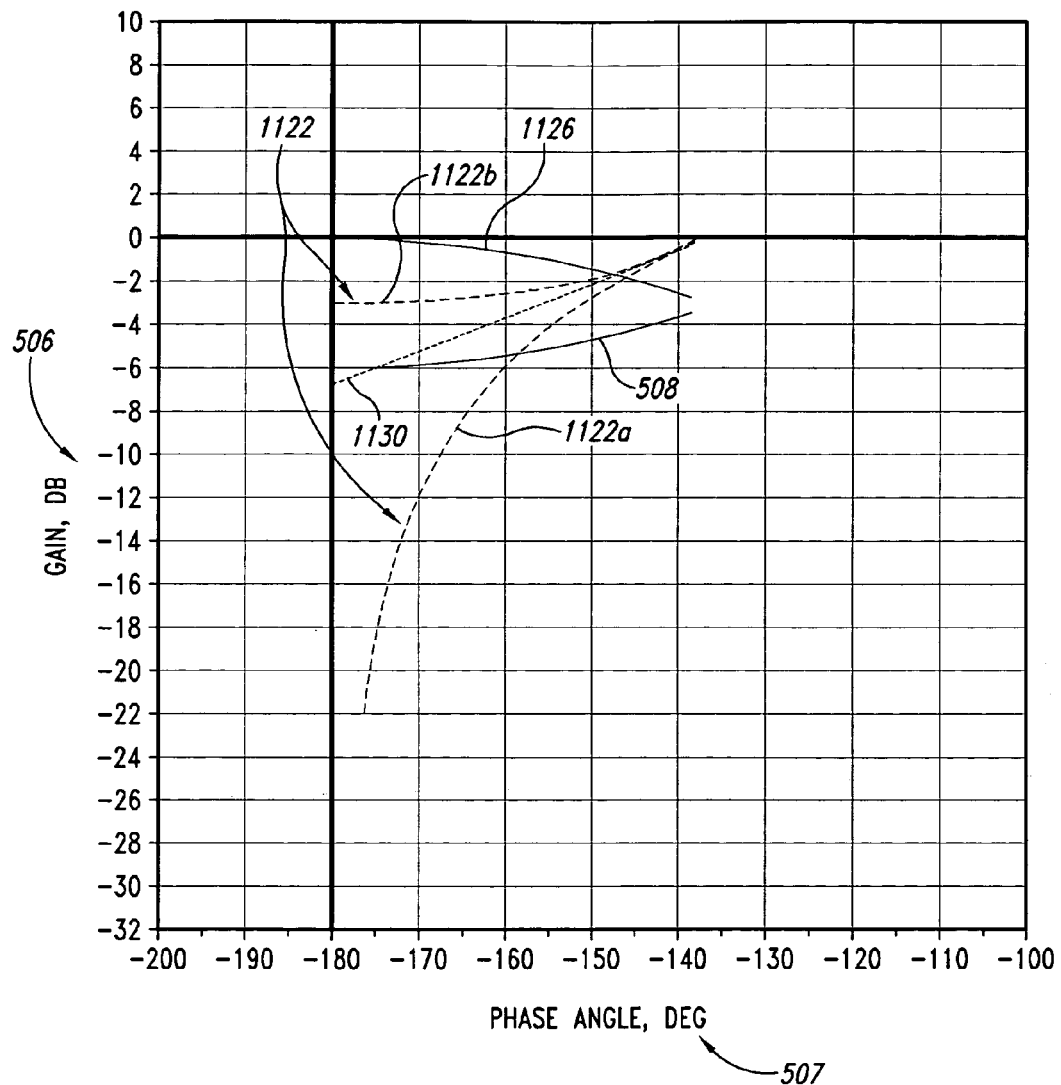
FIG. 11 is a schematic illustration of at least a portion of multiple data relationships stored in graphical form, in accordance with an embodiment of the invention.

FIG. 11, illustrates at least portions of data relationships corresponding to multiple over-steer points that have been plotted and stored on a Nichols chart (with some smoothing). The data relationships can include a line of open loop gain versus open loop phase angle 1126 and a gain rate plot 1122. The local slope of the gain rate plot 1122 at a selected open loop phase angle 507 can be at least approximately equal to the gain rate corresponding to an over-steer point at the selected phase angle. Because the gain rate plot 1122 uses the local slope of the plot at a selected phase angle 507 to represent the gain rate of the associated over-steer point, the gain rate plot 1122 can be positioned or moved to any range of open loop gains 506 provided the local slope at each phase angle 507 is maintained.

In FIG. 11, two segments of the gain rate plot 1122 are shown as a high gain rate segment 1122a and a low gain rate segment 1122b. The high gain rate segment 1122a corresponds to over-steer points where the closed loop gain is greater than one (zero decibels). The low gain rate segment 1122b corresponds to over-steer points where the closed loop gain is less than one (zero decibels). A line corresponding to the critical gain rate 1130 is the gain rate at which the low and high gain rate segments 1122a, 1122b merge (and corresponds to an over-steer point associated with a closed loop gain of one). Although, as discussed above, the critical gain rate 1130 can be computed using various methods, it can also be derived graphically by the merger of the low and high gain rate segments 1122a, 1122b (e.g., it can be at least approximately equal to the slope of the high and low gain rate segments 1122a, 1122b where the two segments merge). In certain embodiments of the invention, the low gain rate segment 1122b can be omitted if open loop systems having gain rates less than the critical gain rate 1130 will not be analyzed.

The line of open loop gain versus open loop phase angle 1126, shown in FIG. 11, corresponds to over-steer points associated with the high gain rate segment 1122a. In the illustrated embodiment, the plot of open loop gain versus open loop phase angle for over-steer points associated with the low gain segment has been omitted because, in many cases, the closed loop gain must be equal to one (zero decibels) before the operator will have difficulty compensating for the predictability problems associated with these over-steer points. In other embodiments, the open loop gain versus open loop phase angle associated with the low gain segment 1122b over-steer points can be included. The lines of constant closed loop gain have been removed from the Nichols chart, except for the line of constant zero decibel closed loop gain 508, which as discussed above, can be useful for evaluating open loop frequency responses with gain rates less than or equal to the critical gain rate 1130.

Figure 12:
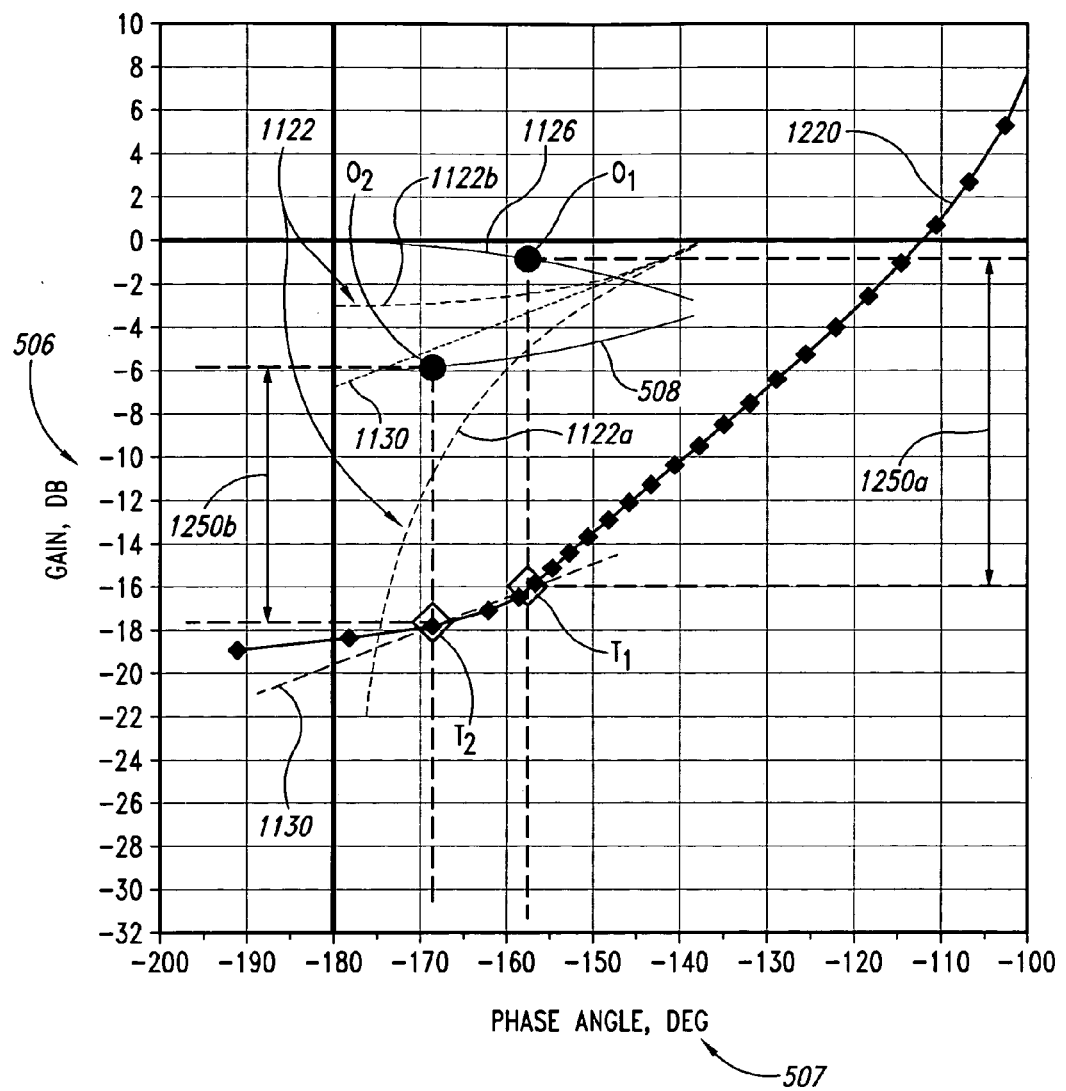
FIG. 12 is a schematic illustration of an open loop frequency response being compared to at least a portion of multiple data relationships stored in graphical form, in accordance with an embodiment of the invention.

FIG. 12 illustrates the stored data relationships being compared to and/or used to analyze a selected open loop frequency response 1220. In FIG. 12 there are two points $T_1$, $T_2$ where the local gain rate (slope) and phase angle 507 combination of the open loop frequency response 1220 are at least approximately equal to the gain rate and phase angle 507 of over-steer points $O_1$, $O_2$. At point $T_1$, the open loop frequency response has the same local slope (gain rate) as the high rate gain segment 1122a of the gain rate plot 1122. The open loop gain 506 for the associated over-steer point can be identified by the intersection (point $O_1$) of the corresponding phase angle 507 and the line of open loop gain versus open loop phase angle 1126. The difference between the open loop gain 506 at point $T_1$ and the open loop gain 506 at point $O_1$ is an over-steer margin 1250a (e.g., the open loop gain at point $O_1$ minus the open loop gain at point $T_1$) for the system. The over-steer margin 1250a indicates how much the open loop gain of the system (through an increase in operator gain K) would have to increase for the system to be at (or intersect) the corresponding over-steer point. As discussed above, when the operator increases the operator gain enough for the system to reach an over-steer point, the predictability of the system response can be reduced. If operator gain is increased further, the predictability of the system response can be further reduced.

The critical gain rate 1130 is simply a gain rate (or slope) and can be compared to an open loop frequency response 1220 at any open loop gain 506 and any open loop phase angle 507. Two lines of critical gain rate 1130 are shown in FIG. 12 to facilitate comparison to the open loop frequency response 1220. As shown in the illustrated embodiment, a portion of the open loop frequency response between points $T_1$ and $T_2$ has a gain rate or slope that is less than the critical gain rate 1130. As discussed above, when an open loop frequency response has a gain rate that is less than the critical gain rate 1130, the system may manifest predictability problems and/or be difficult to analyze. When analyzing systems having gain rates less than the critical gain rate, consideration can be given to the ranges of phase angles 507 where the gain rate of the open loop system 1220 is less than the critical gain rate 1130 and the proximity of any over-steer points.

At point $T_2$, the open loop frequency response has the same local slope (gain rate) as the low rate gain segment 1122b of the gain rate plot 1122. Because, in many cases, the operator can compensate for the predictability problems associated with a system at an over-steer point when the closed loop gain is equal to or less than one (zero decibels), it can be useful to compute an over-steer margin 1250b for the over-steer points corresponding to the low gain rate segment 1122b. The over-steer margin can be the open loop gain 506 at point $O_2$, which is where the corresponding phase angle 507 intersects the zero decibel closed loop line 508 minus the open loop gain at the point $T_2$. In this case, the over-steer margin 1250b indicates how much the open loop gain 506 of the system (through an increase in operator gain) can increase before the open loop frequency response 1220 intersects the zero decibel closed loop line 508 at the open loop phase angle 507 associated with points $T_2$ and $O_2$. This increase will be greater than (or at least approximately equal to) the increase in open loop gain 507 required for the open loop frequency response 1220 to intersect the over-steer point associated with the low gain rate segment 1122b. In other embodiments, any open loop system having gain rate less than or equal to the critical gain rate is deemed to be unacceptable (due to the generally poor response characteristics associated with low gain rates) and over-steer margins associated with the low gain rate segment 1122b are not computed.

Figure 13:
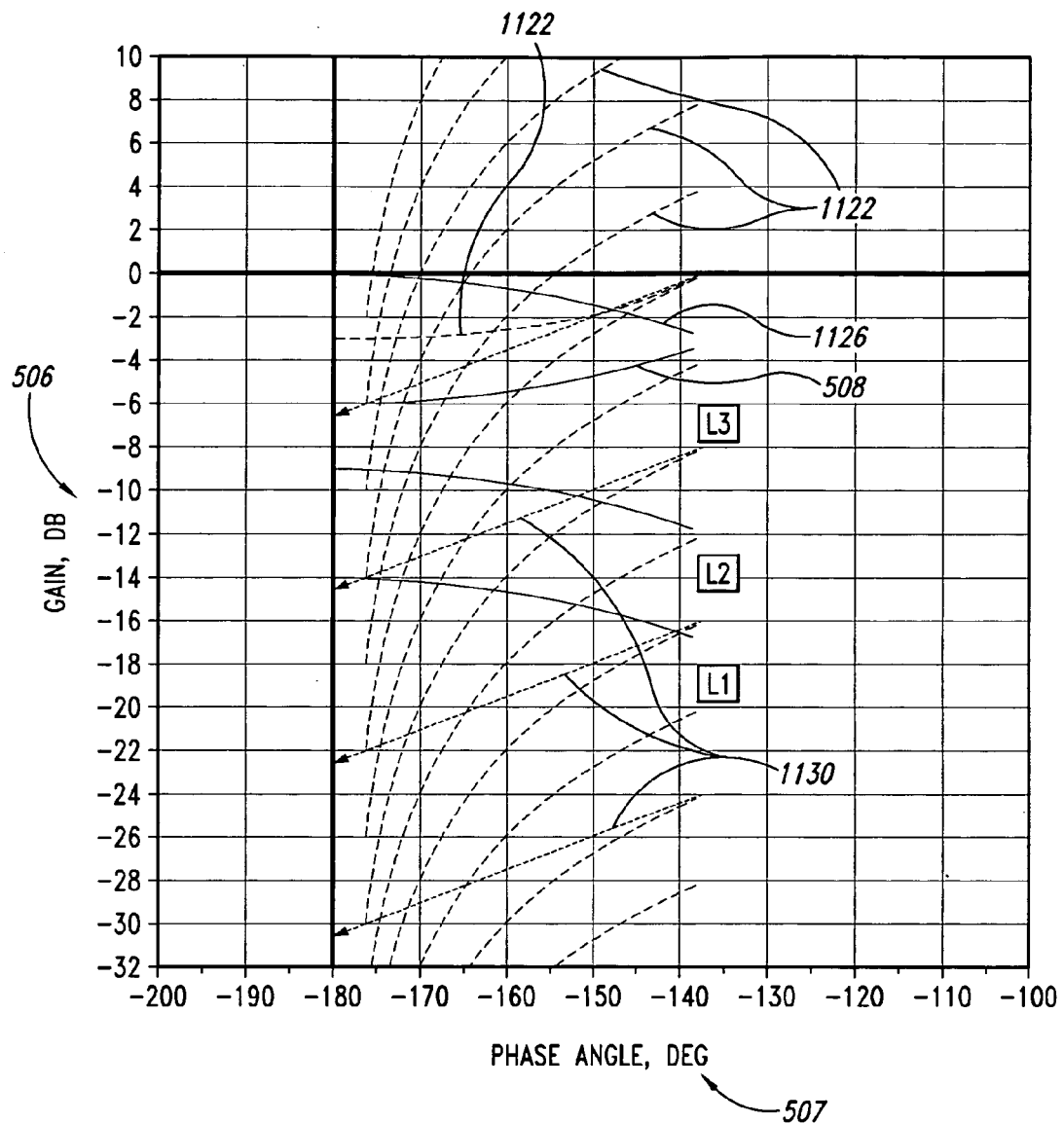
FIG. 13 is a schematic illustration of at least a portion of multiple data relationships stored in graphical form, in accordance with another embodiment of the invention.
Figure 14:
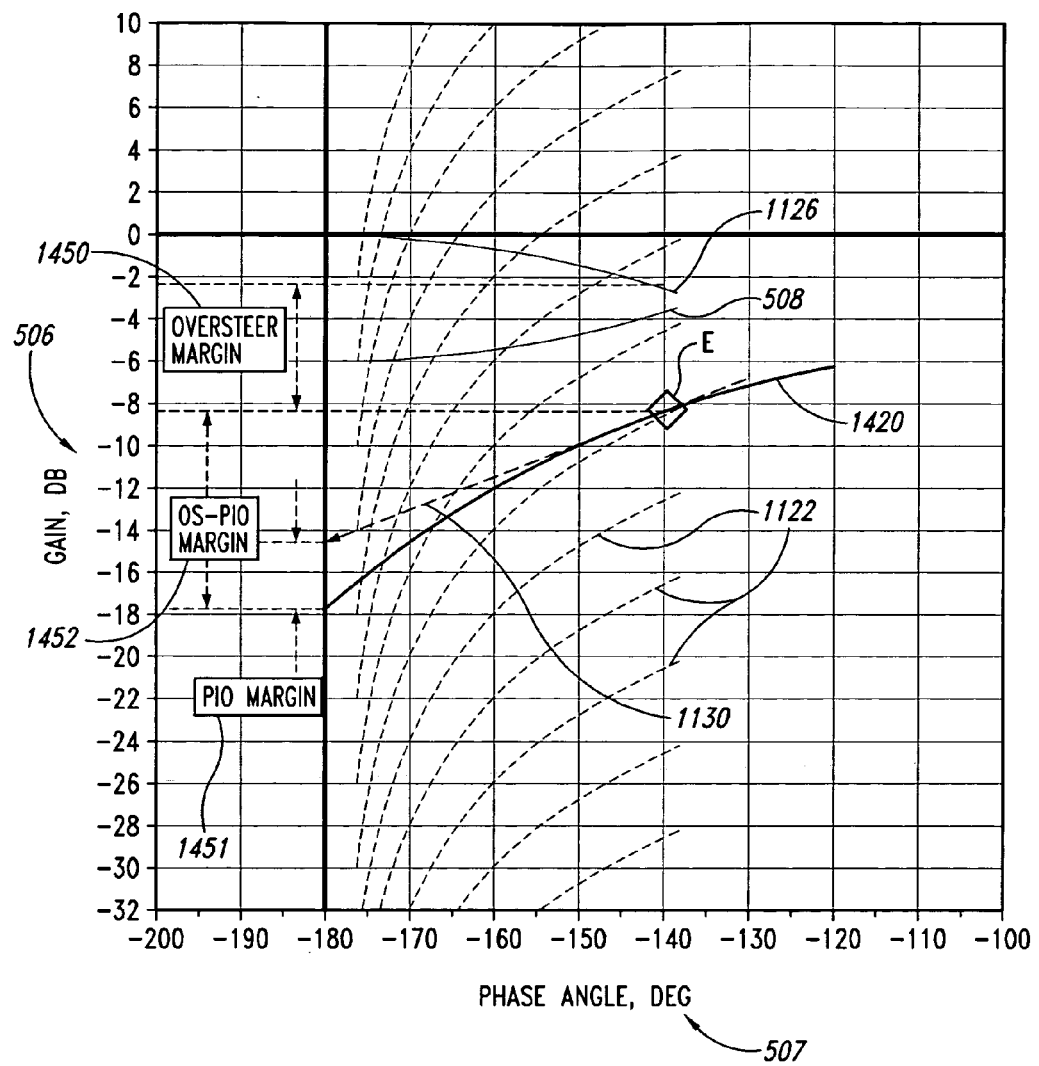
FIG. 14 is a schematic illustration of at least a portion of multiple data relationships stored in graphical form being used to determine an over-steer margin, a PIO margin, and an over-steer to PIO margin for a selected open loop frequency response, in accordance with an embodiment of the invention.

As illustrated in FIG. 13, for ease of comparison/analysis, multiple gain rate plots 1122 can be plotted on one Nichols chart to form a template that allows points where an open loop frequency response are tangent to the gain rate plot to be easily identified. As discussed above, the gain rate plot 1122 can be positioned or moved to any range of open loop gain 506 provided the local gain rate and phase angle 507 relationship is maintained. Accordingly, each of the multiple gain rate plots 1122 provides the same gain rate/phase angle relationship. As discussed above with reference to FIG. 12, where an open loop frequency response is tangent to a gain rate plot, the gain rate and open loop phase angle combination of the open loop frequency response match the gain rate and open loop phase angle combination of an over-steer point.

Additionally, because the critical gain rate 1130 is represented as a constant gain rate or slope on the Nichols chart, it can also be plotted in multiple positions on the template so that a slope of an open loop frequency response can be easily compared to the critical gain rate 1130. The line of open loop gain versus open loop phase angle 1126 and the line of zero decibel closed loop gain 508 can also be placed on the template to ease comparison/analysis. In certain embodiments, empirically derived susceptibility levels, discussed below in greater detail, can also be placed on the template (shown as L1, L2, and L3 in FIG. 13).

In addition to over-steer margins, the template can be used to determine other margins that can be useful in assessing APC/PIO susceptibility of a selected open loop system. For example, in FIG. 14 the open loop frequency response 1420 has a gain rate and phase angle 507 combination that is at least approximately the same as a gain rate and phase angle 507 combination for an over-steer point at point E. An over-steer margin 1450 can be determined as discussed above with reference to FIG. 12. Additionally, a PIO margin 1451 can be determined. The PIO margin 1451 is the open loop gain, at −180 degrees of phase angle, of an imaginary frequency response extending through point E and having a constant slope at least approximately equal to the critical gain rate 1130 minus the open loop gain of the selected open loop frequency response at −180 degrees of phase angle. Small or negative PIO margins 1451 can indicate increased PIO susceptibility.

An over-steer to PIO margin 1452 can also be determined. The over-steer to PIO margin 1452 is the open loop gain of the selected open loop system at point E minus the open loop gain of the selected open loop frequency response at −180 degrees of phase angle. The over-steer to PIO margin 1452 can represent an approximate amount of operator gain increase that will be needed to reach a PIO, after the operator has increased the operator gain enough to reach the associated over-steer point.

Figure 15:
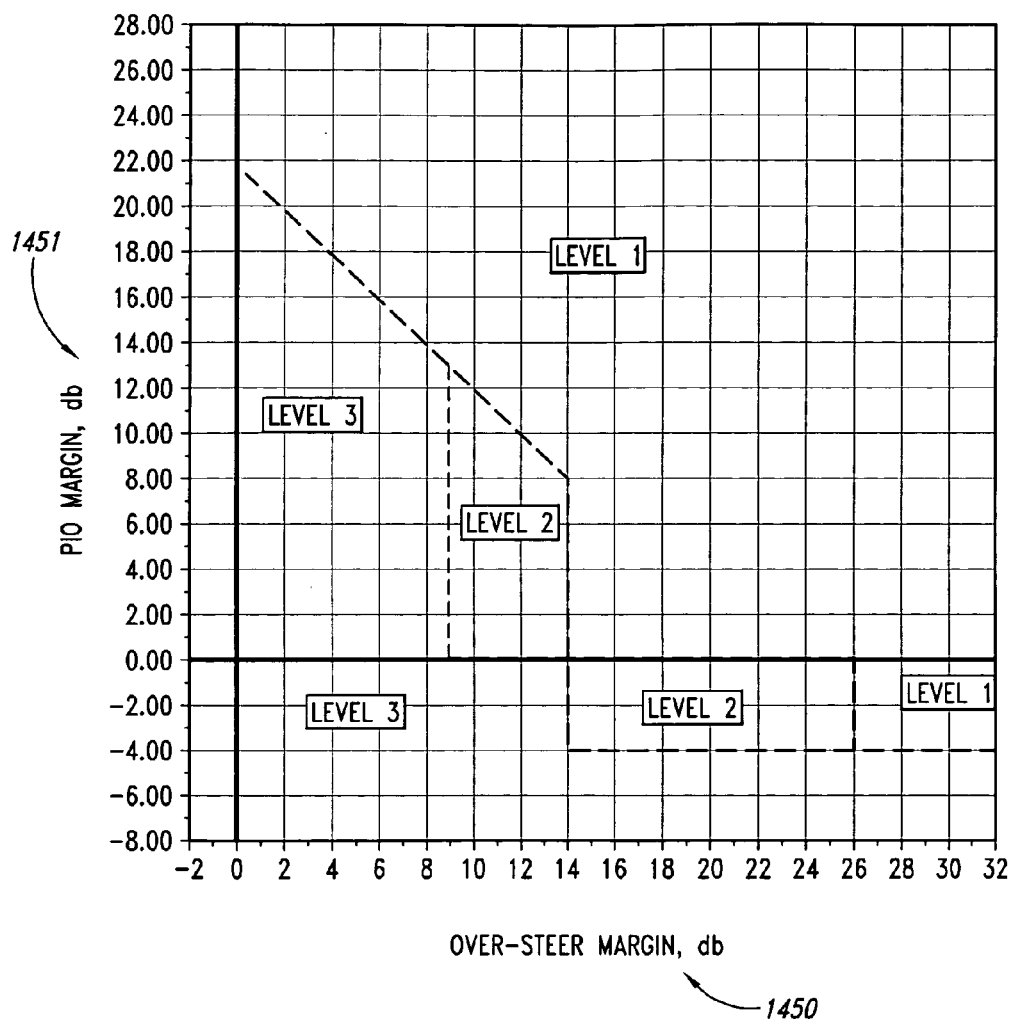
FIG. 15 is a schematic illustration of a chart for determining an indication of PIO susceptibility of a selected open loop frequency response based on a corresponding PIO and over-steer margin, in accordance with an embodiment of the invention.

As discussed above with reference to FIG. 13, certain levels of PIO susceptibility can be established based on empirical data. These levels can vary with system type (e.g., the type of aircraft and/or the aircraft axis involved). FIG. 15 illustrates three levels (e.g., Level 1/low, level 2/medium, and level 3/high) of PIO susceptibility boundaries associated with a combination of PIO margin 1451 and over-steer margin 1450.

Figure 16:
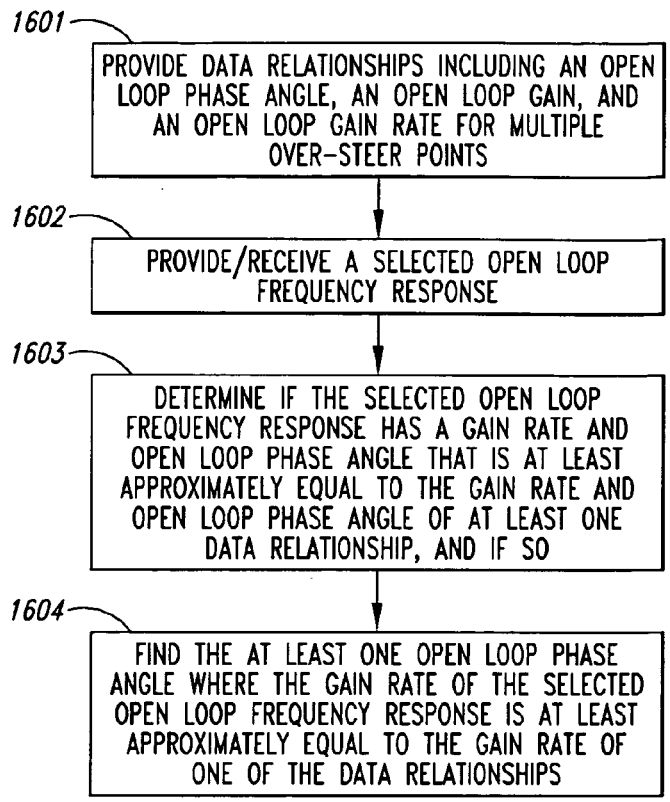
FIG. 16 is a schematic illustration of a process using data relationships for evaluating the susceptibility of operator system coupling, in accordance with an embodiment of the invention.

Accordingly, as shown in FIG. 16, one embodiment of the invention is directed toward a method for evaluating a susceptibility of operator system coupling that includes providing data relationships (e.g., a set of data in a data table or on a graph) that include an open loop phase angle, an open loop gain, and an open loop gain rate for multiple over-steer points (process portion 1601). The method can further include providing/receiving a selected open loop frequency response (process portion 1602). The method can still further include determining if the selected open loop frequency response has a gain rate and open loop phase angle that is at least approximately equal to the gain rate and open loop phase angle of at least one data relationship (process portion 1603). If so, the method can include finding the at least one open loop phase angle where the gain rate of the selected open loop frequency response is at least approximately equal to the gain rate of one of the data relationships (process portion 1604). In other embodiments, the process can include comparing data of the data relationship to the selected open loop system and/or using the data of the data relationships to analyze the selected frequency response. For example, by using the data relationships the over-steer margin and over-steer to PIO margin can be determined.

Figure 17:
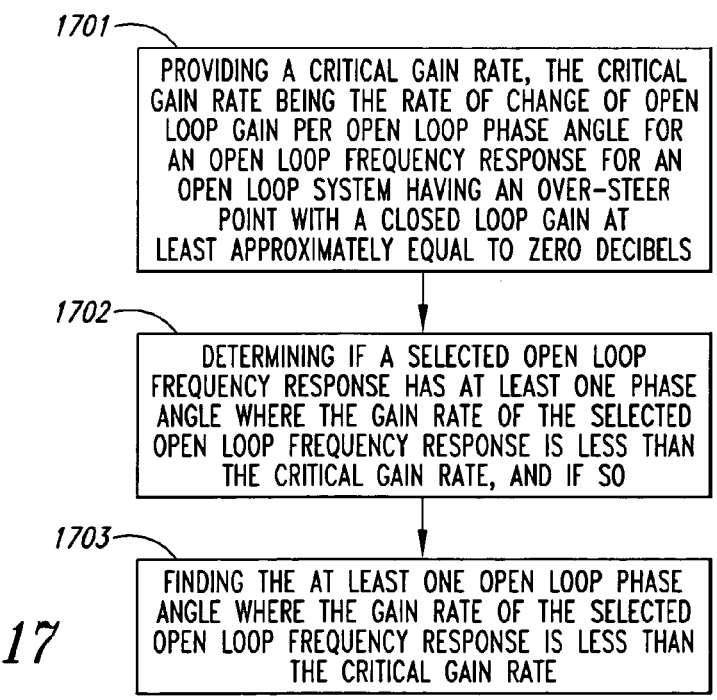
FIG. 17 is a schematic illustration of a process using critical gain rate for evaluating the susceptibility of operator system coupling, in accordance with another embodiment of the invention.

As shown in FIG. 17, still other embodiments of the invention are directed toward a method for evaluating the susceptibility of operator system coupling that includes providing a critical gain rate, the critical gain rate being the rate of change of open loop gain per open loop phase angle for an open loop system response at an over-steer point with a closed loop gain at least approximately equal to zero decibels (process portion 1701). The method can further include determining if a selected open loop frequency response has at least one phase angle where the gain rate of the selected open loop frequency response is less than the critical gain rate (process portion 1702). If it does, the method can still further include finding the at least one open loop phase angle where the gain rate of the selected open loop frequency response is less than the critical gain rate (process portion 1703). In other embodiments, the method can further include using the critical gain rate to compare to and/or analyze the selected open loop frequency response. For example, as discussed above with reference to FIG. 11, the critical gain rate can be used to determine whether an over-steer point corresponds to the low or high gain rate segment of the gain rate plot and/or to compute a PIO margin.

Figure 18A:
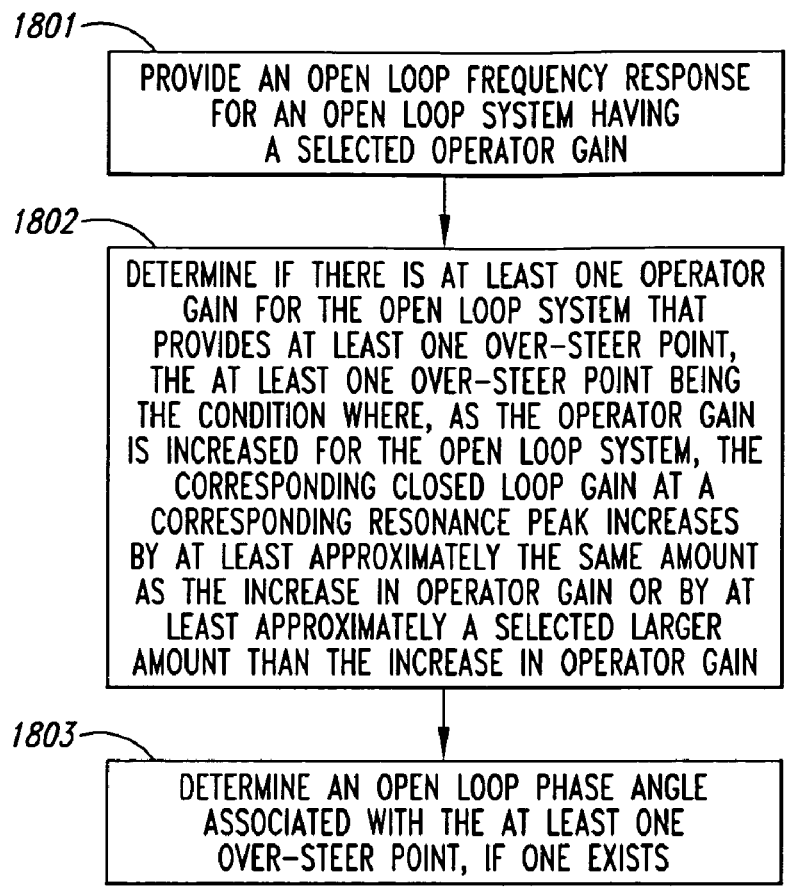
FIG. 18A is a schematic illustration of a process for evaluating the susceptibility of operator system coupling, in accordance with still another embodiment of the invention.

In other embodiments, the same principles and techniques can be applied to analyze an open loop frequency response without the use of stored data relationships. As illustrated in FIG. 18A, a method for evaluating the susceptibility of a system to operator coupling can include providing an open loop frequency response for an open loop system having a selected operator gain (process portion 1801). The method can further include determining if there is at least one operator gain for the open loop system that provides at least one over-steer point (process portion 1802). The at least one over-steer point can be the condition where, as the operator gain is increased for the open loop system, the corresponding closed loop gain at a corresponding resonance peak increases by at least approximately the same amount as the increase in operator gain or at least approximately a selected larger amount than the increase in operator gain. The over-steer point can be determined by using the relationship between open and closed loop frequency responses (e.g., as illustrated by a Nichols chart) and varying the operator gain, similar to the process discussed above with reference to FIGS. 6 and 7, or using the complex plane analysis illustrated in FIGS. 10A-F. The method can still further include determining an open loop phase angle associated with the at least one over-steer point, if one exists (process portion 1803).

Figure 18B:
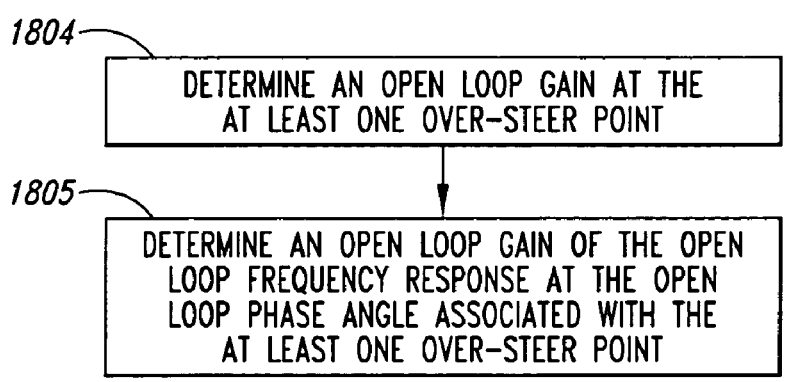
FIG. 18B is a schematic illustration of additional process portions that can be used with the process shown in FIG. 18A, in accordance with yet another embodiment of the invention.

In still other embodiments, as shown in FIG. 18B, the method can further include determining an open loop gain at the at least one over-steer point (process portion 1804) and an open loop gain of the open loop frequency response at the open loop phase angle associated with the at least one over-steer point (process portion 1805). In other embodiments, the method can further include analyzing the open loop frequency response using various methods described above. For example, the over-steer margin and over-steer to PIO margin can be determined.

Figure 18C:
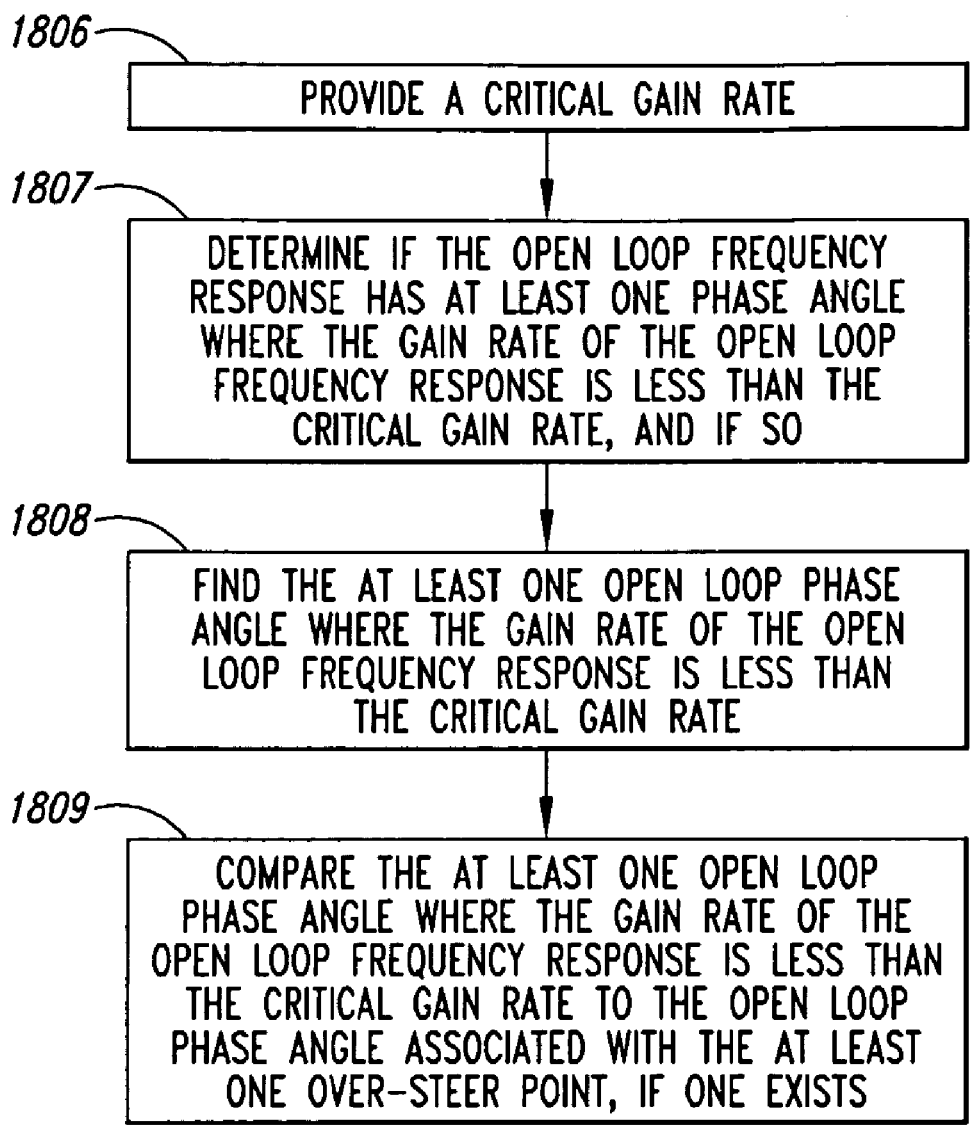
FIG. 18C is a schematic illustration of additional process portions that can be used with the process shown in FIG. 18A, in accordance with still another embodiment of the invention.

In still other embodiments, a critical gain rate can be combined with the above method to provide additional analytical capability. As shown in FIG. 18C, the above method can further include providing a critical gain rate (process portion 1806). The critical gain rate can be the rate of change of open loop gain per open loop phase angle of an open loop frequency response for an open loop system having an over-steer point with a closed loop gain at least approximately equal to zero decibels. The method can further include determining if the open loop frequency response has at least one phase angle where the gain rate of the open loop frequency response is less than the critical gain rate (process portion 1807). If so, the method can still further include finding the at least one open loop phase angle where the gain rate of the open loop frequency response is less than the critical gain rate (process portion 1808). In other embodiments, the method can further include analyzing the open loop frequency response using various methods described above. For example, a PIO margin can be determined using the critical gain rate.

Although many of the processes and embodiments described above have been described in a graphical context, it should be recognized that the invention need not be so limited. For example, portions and/or combinations of various portions can be carried out manually (e.g., using tables) and/or through the use of a computing system (e.g., one or more computer elements, memories, databases, and/or computers) using various numerical techniques (e.g., using iterative processes, closed-form equations, approximations, trigonometric relationships, and/or graphical solutions). Additionally, as described above, portions of the processes and/or the data related to the processes can be stored on computer-readable media.

One feature of embodiments of the invention described above is that both frequency and gain are used extensively to assess the APC/PIO susceptibility of a selected system. This can yield valuable insight into system performance. An advantage of this feature is that the assessment can be used as a design tool to reduce the likelihood that the system will exhibit an APC/PIO during operation.

Another feature of embodiments of the invention described above is that data relationships can be stored for later use in assessing the APC/PIO susceptibility of a selected system. These stored data relationships can be quickly and/or easily compared to a selected system. An advantage of this feature is that a selected system can be analyzed for APC/PIO susceptibility in less time than with present methods. This reduction in analysis time over present methods can also result in monetary savings during a system development program.

It should be recognized that with certain aircraft designs, aircraft response characteristics can change depending on the magnitude of the pilot's input. These changes can be caused by many different factors, including flight control laws, actuator characteristics, flight control gearing, and/or the combination of flight control surfaces used to respond to various pilot inputs. For example, a selected aircraft can use ailerons to produce roll in response to small roll control inputs and a combination of ailerons and spoilers for large roll control inputs. This change in the open loop system between the use of small and large roll control inputs can change the open loop frequency response (e.g., the shape of the open loop frequency response curve (gain versus phase angle)) significantly. Therefore, in many cases it can be advisable to examine the different frequency responses that result from using different control input magnitudes.

For example, several frequency responses can be generated using constant magnitude input control frequency sweeps, varying the magnitude used for each frequency sweep. Each frequency response can then be analyzed using embodiments of the invention described above. Comparing various combinations of the analysis of each frequency response and the frequency responses themselves can provide significant insight into the PIO/APC susceptibility of the aircraft, especially when the frequency responses and associated over-steer points vary significantly. In one embodiment, an open loop phase angle of a first open loop frequency response where a gain rate of the first open loop frequency response is at least approximately equal to the gain rate of one of the data relationships corresponding to an over-steer point can be determined. The open loop gain of an imaginary open loop frequency response at a phase angle of −180 degrees can be determined where the imaginary open loop frequency response has a constant gain rate, equal to the critical gain rate, between an open loop gain and open loop phase angle of the first open loop frequency at the open loop phase angle corresponding to the over-steer point and a phase angle of −180 degrees. The open loop gain of the imaginary open loop frequency response at a phase angle of −180 degrees can be compared to the open loop gain of a second open loop frequency response at a phase angle of −180 degrees.

From the foregoing, it will be appreciated that specific embodiments of the invention have been described herein for purposes of illustration, but that various modifications may be made without deviating from the spirit and scope of the invention. For example, features described in the context of particular embodiments can be combined or eliminated in other embodiments. Accordingly, the invention is not limited except as by the appended claims.

We claim:

1. A method for evaluating the susceptibility of a system to operator coupling, the method comprising:

providing data relationships for multiple over-steer points, each over-steer point being the condition where, as operator gain is increased for a corresponding open loop system, the corresponding closed loop gain at a corresponding resonance peak increases by at least approximately the same amount as the increase in operator gain or at least approximately a selected larger amount than the increase in operator gain, and wherein each of the data relationships include a corresponding open loop phase angle, open loop gain, and gain rate, and further wherein the gain rate is the rate of change of open loop gain per open loop phase angle of the corresponding open loop system response at the over-steer point;

providing a selected open loop frequency response; and determining if the selected open loop frequency response has at least one open loop phase angle where a gain rate of the selected open loop frequency response is at least approximately equal to the gain rate of one of the data relationships at the corresponding open loop phase angle; and if so finding the at least one open loop phase angle where the gain rate of the selected open loop frequency response is at least approximately equal to the gain rate of one of the data relationships;

at least one of storing the at least one open loop phase angle, displaying the at least one open loop phase angle, printing the at least one open loop phase angle, and using the at least open loop phase angle to evaluate the susceptibility of system to operator coupling.

2. The method of claim 1 wherein increasing operator gain includes increasing a magnitude of an operators input.

3. The method of claim 1 wherein:

providing data relationships for multiple over-steer points includes providing at least a portion of the data relationships for multiple over-steer points stored on at least one of a computing system and a computer readable medium;

determining if the selected open loop frequency response has at least one open loop phase angle where the gain rate of the selected opeii loop frequency response is at least approximately equal to the gain rate of one of the data relationships includes determining if the selected open loop frequency response has at least one open loop phase angle where the gain rate of the selected open loop frequency response is at least approximately equal to the gain rate of one of the data relationships using a computing system; and finding the at least one open loop phase angle where the gain rate of the selected open loop frequency response is at least approximately equal to the gain rate of one of the data relationships includes finding the at least one open loop phase angle where the gain rate of the selected open loop frequency response is at least approximately equal to the gain rate of one of the data relationships.

4. The method of claim 1 wherein:

providing data relationships for multiple over-steer points includes providing at least a portion of the data relationships for multiple over-steer points in graphical form;

determining if the selected open loop frequency response has at least one open loop phase angle where the gain rate of the selected open loop frequency response is at least approximately equal to the gain rate of one of the data relationships includes plotting the selected open loop frequency response in graphical form and comparing the selected open loop frequency response to the data relationships; and finding the at least one open loop phase angle where the gain rate of the selected open loop frequency response is at least approximately equal to the gain rate of one of the data relationships includes comparing the selected open loop frequency response to the data relationships.

5. The method of claim 1 wherein the method further comprises comparing an open loop gain of the selected open loop frequency at the at least one open loop phase angle to the open loop gain of the data relationship at the at least one open loop phase angle.

6. The method of claim 1 wherein providing data relationships for multiple over-steer points includes providing data relationships that include a corresponding closed loop gain, and wherein the method further comprises:

determining if the closed loop gain of the data set corresponding to the at least one open loop phase angle is equal to zero decibels or less than zero decibels; and if so comparing an open loop gain of the selected open loop frequency at the at least one open loop phase angle to an open loop gain associated with the combination of the at least one open loop phase angle and a closed loop gain of zero decibels.

7. The method of claim 1 wherein the method further comprises computing an over-steer margin for the at least one of the open loop phase angles, the over-steer margin being the open loop gain of the data relationship at the at least one open loop phase angle minus the open loop gain of the selected open loop frequency at the at least one open loop phase angle.

8. The method of claim 1 wherein providing data reiationsnips for multiple over-steer points includes providing data relationships that include a corresponding closed loop gain, and wherein the method further comprises:

determining if the closed loop gain of the data set corresponding to the at least one open loop phase angle is equal to zero decibels or less than zero decibels; and if so computing an over-steer margin for the at least one of the open loop phase angles, the over-steer margin being an open loop gain associated with the combination of the at least one open loop phase angle and a closed loop gain of zero decibels minus the open loop gain of the selected open loop frequency at the at least one open loop phase angle.

9. The method of claim 1 wherein providing data relationships for multiple over-steer points includes providing data relationships that include a corresponding closed loop gain, and wherein the method further comprises:

providing a critical gain rate, the critical gain rate being the rate of change of open loop gain per open loop phase angle of an open loop frequency response for an open loop system having an over-steer point with a closed loop gain at least approximately equal to zero decibels;

determining if the gain rate of the open loop frequency response at the at least one open loop phase angle is equal to the critical gain rate or less than the critical gain rate; and if so comparing an open loop gain of the selected open loop frequency at the at least one open loop phase angle to an open loop gain associated with the combination of the at least one open loop phase angle and a closed loop gain of zero decibels.

10. The method of claim 1 wherein the method further comprises:

providing a critical gain rate, the critical gain rate being the rate of change of open loop gain per open loop phase angle of an open loop frequency response for an open loop system having an over-steer point with a closed loop gain at least approximately equal to zero decibels;

determining if the selected open loop frequency response has at least one phase angle where the gain rate of the selected open loop frequency response is less than the critical gain rate; and if so finding the at least one open loop phase angle where the gain rate of the selected open loop frequency response is less than the critical gain rate; and comparing the at least one open loop phase angle where the gain rate of the selected open loop frequency response is less than the crtical gain rate to the at least one open loop phase angle where the gain rate of the selected open loop frequency response is at least approximately equal to the gain rate of one of the data relationships, if one exists.

11. The method of claim 1 wherein the method further comprises:
providing a critical gain rate, the critical gain rate being the rate of change of open loop gain per open loop phase angle of an open loop frequency response for an open loop system having an over-steer point with a closed loop gain at least approximately equal to zero decibels;
determining the open loop gain of an imaginary open loop frequency response at a phase angle of −180 degrees, the imaginary open loop frequency response having a constant gain rate between an open loop gain and open loop phase angle of the selected open loop frequency at the at least one open loop phase angle and a phase angle of −180 degrees, the constant gain rate being at least approximately equal to the critical gain rate;
finding the open loop gain of the selected open loop frequency response at a phase angle of −180 degrees;
comparing the open loop gain of the imaginary open loop frequency response and the selected open loop frequency response at −180 degrees.

12. The method of claim 1 wherein the method further comprises:
providing a critical gain rate, the critical gain rate being the rate of change of open loop gain per open loop phase angle of an open loop frequency response for an open loop system having an over-steer point with a closed loop gain at least approximately equal to zero decibels;
determining the open loop gain of an imaginary open loop frequency response at a phase angle of −180 degrees, the imaginary open loop frequency response having a constant gain rate between an open loop gain and open loop phase angle of the selected open loop frequency at the at least one open loop phase angle and a phase angle of −180 degrees, the constant gain rate being at least approximately equal to the critical gain rate;
finding the open loop gain of the selected open loop frequency response at a phase angle of −180 degrees; and
computing a PIO margin, the PIO margin being the open loop gain of the imaginary open loop frequency response minus the open loop gain of ihe selected open loop frequency response at −180 degrees.

13. The method of claim 1 wherein the method further comprises:
computing the over-steer margin for at least one of the open loop phase angles where the gain rate of the selected open loop frequency response is at least approximately equal to the gain rate of one of the data relationships, the over-steer margin being the open loop gain of the data relationship at the at least one open loop phase angle minus the open loop gain of the selected open loop frequency at the at least one open loop phase angle;
providing a critical gain rate, the critical gain rate being the rate of change of open loop gain per open loop phase angle of an open loop frequency response for an open loop system having an over-steer point with a closed loop gain at least approximately equal to zero decibels;
determining the open loop gain of an imaginary open loop frequency response at a phase angle of −180 degrees, the imaginary open loop frequency response having a constant gain rate between an open loop gain and open loop phase angle of the selected open loop frequency at the at least one open loop phase angle and a phase angle of −180 degrees, the constant gain rate being at least approximately equal to the critical gain rate;
finding the open loop gain of the selected open loop frequency response at a phase angle of −180 degrees;
computing a PIO margin, the PIO margin being the open loop gair of the imaginary open loop frequency response minus the open loop gain of the selected open loop frequency response at −180 degrees; and
comparing the over-steer margin to the PIO margin.

14. The method of claim 1 wherein the method further comprises:
finding the open loop gain of the selected open loop frequency at the at least one open loop phase angle;
determining the open loop gain of the selected open loop frequency response at a phase angle of −180 degrees; and
comparing the open loop gain of the selected open loop frequency at the at least one open loop phase angle and the open loop gain of the selected open loop frequency response at a phase angle of −180 degrees.

15. The method of claim 1 wherein the method further comprises:
finding the open loop gain of the selected open loop frequency at the at least one open loop phase angle;
determining the open loop gain of the selected open loop frequency response at a phase angle of −180 degrees; and
computing an over-steer to PIO margin, the over-steer to PIO imagine being the open loop gain of the selected open loop frequency at the at least one open loop phase angle minus the open loop gain of the selected open loop frequency response at a phase angle of −180 degrees.

16. The method of claim 1 wherein the selected open loop frequency response includes an open loop frequency response of an aircraft.

17. The method of claim 1 wherein providing a selected open loop frequency response includes providing a first open loop frequency response, and wherein the method further includes:
providing a critical gain rate, the critical gain rate being the rate of change of open loop gain per open loop phase angle of an open loop frequency response for an open loop system having an over-steer point with a closed loop gain at least approximately equal to zero decibels;
determining the open loop gain of an imaginary open loop frequency response at a phase angle of −180 degrees, the imaginary open loop frequency response having a constant gain rate between an open loop gain and open loop phase angle of the first open loop frequency at the at least one open loop phase angle and a phase angle of −180 degrees, the constant gain rate being at least approximately equal to the critical gain rate;
providing a second open loop frequency response; and
comparing the open loop gain of the imaginary open loop frequency response at a phase angle of −180 degrees to the open loop gain of the second open loop frequency response at a phase angle of −180 degrees.

18. A method for developing data to be used to evaluate the susceptibility of an operator coupling with an operator controlled system, the method comprising:
determining an over-steer point for each of multiple open loop systems having corresponding open loop frequency responses, each over-steer point being the condition where, as the operator gain is increased for each corresponding open loop system, the corresponding closed loop gain at a corresponding resonance peak increases by at least approximately the same amount as the increase in operator gain or at least approximately a selected larger amount than the increase in operator gain; and determining data relationships for each over-steer point, each data relationship including a corresponding open loop phase angle, an open loop gain, and a gain rate, the gain rate being the rate of change of open loop gain per open loop phase angle of the corresponding open loop system response;

storing the data relationships.

19. The method of claim 18 wherein:

determining an over-steer point for each of multiple of open loop frequency responses includes determining an over-steer point for each of multiple open loop frequency responses using a computing system; and determining data relationships for each over-steer point includes determining data relationships for each over-steer point using a computing system.

20. The method of claim 18 wherein storing the data relationships includes storing at least a portion of the data relationships in at least one of a computing system and a computer readable medium.

21. The method of claim 18 wherein storing the data relationships includes storing at least a portion of the data relationships on paper in at least one of a tabular form and a graphical form.

22. A computer readable medium having conterts configured to carry out a method for evaluating the susceptibility of a system to operator coupling, the method comprising:

at least one of storing and computing data relationships for multiple over-steer points, each over-steer point being the condition where, as operator gain is increased for a corresponding open loop system, the corresponding closed loop gain at a corresponding resonance peak increases by at least approximately the same amount as the increase in operator gain or at least approximately a selected larger amount than the increase in operator gain, and each of the data relationships including a corresponding open loop phase angle, an open loop gain, and a gain rate, the gain rate being the rate of change of open loop gain per open loop phase angle of the corresponding open loop system response; and determining if a selected open loop frequency response has at least one open loop phase angle where the gain rate of the selected open loop frequency response is at least approximately equal to the gain rate of one of the data relationships at the corresponding open loop phase angle; and if so determining the at least one open loop phase angle where the gain rate of the selected open loop frequency response is at least approximately equal to the gain rate of one of the data relationships.

23. The computer readable medium of claim 22 wherein the method further comprises comparing the open loop gain of the selected open loop frequency at the at least one open loop phase angle to the open loop gain of the data relationship at the at least one open loop phase angle.

24. The computer readable medium of claim 22 wherein the method further comprises:

providing a critical gain rate, the critical gain rate being the rate of change of open loop gain per open loop phase angle of an open loop frequency response for an open loop system having an over-steer point with a closed loop gain at least approximately equal to zero decibels;

determining if the selected open loop frequency response has at least one phase angle where the gain rate of the selected open loop frequency response is less than the critical gain rate; and if so determining the at least one open loop phase angle where the gain rate of the selected open loop frequency response is less than the critical gain rate; and comparing the at least one open loop phase angle where the gain rate of the selected open loop frequency response is less than the critical gain rate to the at least one open loop phase angle where the gain rate of the selected open loop frequency response is at least approximately equal to the gain rate of one of the data relationships, if one exists.

25. The computer readable medium of claim 22 wherein the method further comprises:

providing a critical gain rate, the critical gain rate being the rate of change of open loop gain per open loop phase angle of an open loop frequency response for an open loop system having an over-steer point with a closed loop gain at least approximately equal to zero decibels;

determining the open loop gain of an imaginary open loop frequency response at a phase angle of −180 degrees, the imaginary open loop frequency response having a constant gain rate between an open loop gain and open loop phase angle of the selected open loop frequency at the at least one open loop phase angle and a phase angle of −180 degrees, the constant gain rate being at least approximately equal to the critical gain rate;

determining the open loop gain of the selected open loop frequency response at a phase angle of −180 degrees; and comparing the open loop gain of the imaginary open loop frequency response and the selected open loop frequency response at −180 degrees.

26. The computer readable medium of claim 22 wherein the method further comprises:

finding the open loop gain of the selected open loop frequency at the at least one open loop phase angle;

determining the open loop gain of the selected open loop frequency response at a phase angle of −180 degrees; and comparing the open loop gain of the selected open loop frequency at the at least one open loop phase angle and the open loop gain of the selected open loop frequency response at a phase angle of −180 degrees.

27. The computer readable medium of claim 22 wherein determining if a selected open loop frequency response has at least one open loop phase angle where the gain rate of the selected open loop frequency response is at least approximately equal to the gain rate of one of the data relationships at the corresponding open loop phase angle includes determining if a first open loop frequency response has at least one open loop phase angle where the gain rate of the selected open loop frequency response is at least approximately equal to the gain rate of one of the data relationships at the corresponding open loop phase angle, and wherein the method further includes:

providing a critical gain rate, the critical gain rate being the rate of change of open loop gain per open loop phase angle of an open loop frequency response for an open loop system having an over-steer point with a closed loop gain at least approximately equal to zero decibels;

determining the open loop gain of an imaginary open loop frequency response at a phase angle of −180 degrees, the imaginary open loop frequency response having a constant gain rate between an open loop gain and open loop phase angle of the first open loop frequency at the at least one open loop phase angle and a phase angle of −180 degrees, the constant gain rate being at least approximately equal to the critical gain rate;

providing a second open loop frequency response; and comparing the open loop gain of the imaginary open loop frequency response at a phase angle of −180 degrees to the open loop gain of the second open loop frequency response at a phase angle of −180 degrees.

28. A system for evaluating the susceptibility of a system to operator coupling, the system comprising:

means for providing data relationships for multiple over-steer points, each over-steer point being the condition where, as operator gain is increased for a corresponding open loop system, the corresponding closed loop gain at a corresponding resonance peak increases by at least approximately the same amount as the increase in operator gain or at least approximately a selected larger amount than the increase in operator gain, and each of the data relationships including a corresponding open loop phase angle, an open loop gain, and a gain rate, the gain rate being the rate of change of open loop gain per open loop phase angle of the corresponding open loop system response;

means for receiving a selected open loop frequency response; and means for determining if the selected open loop frequency response has at least one open loop phase angle where the gain rate of the selected open loop frequency response is at least approximately equal to the gain rate of one of the data relationships at the corresponding open loop phase angle; and if so means for finding the at least one open loop phase angle where the gain rate of the selected open loop frequency response is at least approximately equal to the gain rate of one of the data relationships.

29. The system of claim 28 wherein the system further comprises means for comparing the open loop gain of the selected open loop frequency at the at least one open loop phase angle to the open loop gain of the data relationship at the at least one open loop phase angle.

30. The system of claim 28 wherein the means for providing data relationships for multiple over-steer points includes a means for providing data relationships that include a corresponding closed loop gain, and wherein the system further comprises:

means for determining if the closed loop gain of the data set corresponding to the at least one open loop phase angle is equal to zero decibels or less than zero decibels; and if so means for comparing an open loop gain of the selected open loop frequency at the at least one open loop phase angle to an open loop gain associated with the combination of the at least one open loop phase angle and a closed loop gain of zero decibels.

31. The system of claim 28 wherein the system further comprises:

means for providing a critical gain rate, the critical gain rate being the rate of change of open loop gain per open loop phase angle of an open loop frequency response for an open loop system having an over-steer point with a closed loop gain at least approximately equal to zero decibels;

means for determining if the selected open loop frequency response has at least one phase angle where the gain rate of the selected open loop frequency response is less than the critical gain rate; and if so means for finding the at least one open loop phase angle where the gain rate of the selected open loop frequency response is less than the critical gain rate; and means for comparing the at least one open loop phase angle where the gain rate of the selected open loop frequency response is less than the critical gain rate to the at least one open loop phase angle where the gain rate of the selected open loop frequency response is at least approximately equal to the gain rate of one of the data relationships, if one exists.

32. The system of claim 28 wherein the system further comprises:

means for providing a critical gain rate, the critical gain rate being the rate of change of open loop gain per open loop phase angle of an open loop frequency response for an open loop system having an over-steer point with a closed loop gain at least approximately equal to zero decibels;

means for determining the open loop gain of an imaginary open loop frequency response at a phase angle of −180 degrees, the imaginary open loop frequency response having a constant gain rate between an open loop gain and open loop phase angle of the selected open loop frequency at the at least one open loop phase angle and a phase angle of −180 degrees, the constant gain rate being at least approximately equal to the critical gain rate;

means for finding the open loop gain of the selected open loop frequency response at a phase angle of −180 degrees; and means for comparing the open loop gain of the imaginary open loop frequency response and the selected open loop frequency response at −180 degrees.

33. The system of claim 28 wherein the system further comprises:

means for finding the open loop gain of the selected open loop frequency at the at least one open loop phase angle;

means for determining the open loop gain of the selected open loop frequency response at a phase angle of −180 degrees; and means for comparing the open loop gain of the selected open loop frequency at the at least one open loop phase angle and the open loop gain of the selected open loop frequency response at a phase angle of −180 degrees.

34. The system of claim 28 wherein means for receiving a selected open loop frequency response includes means for receiving a first open loop frequency response, and wherein the system further includes:

means for providing a critical gain rate, the critical gain rate being the rate of change of open loop gain per open loop phase angle of an open loop frequency response for an open loop system having an over-steer point with a closed loop gain at least approximately equal to zero decibels;

means for determining the open loop gain of an imaginary open loop frequency response at a phase angle of −180 degrees, the imaginary open loop frequency response having a constant gain rate between an open loop gain and open loop phase angle of the first open loop frequency at the at least one open loop phase angle and a phase angle of −180 degrees, the constant gain rate being at least approximately equal to the critical gain rate;

means for receiving a second open loop frequency response; and means for comparing the open loop gain of the imaginary open loop frequency response at a phase angle of −180 degrees to the open loop gain of the second open loop frequency response at a phase angle of −180 degrees.

35. A system for developing data to be used to evaluate the susceptibility of a system to operator coupling, the system comprising:

means for determining an over-steer point for each of multiple open loop systems having open loop frequency responses, each over-steer point being the condition where, as operator gain is increased for each corresponding open loop system, the corresponding closed loop gain at a corresponding resonance peak increases by at least approximately the same amount as the increase in operator gain or at least approximately a selected larger amount than the increase in operator gain; and means for determining data relationships for each over-steer point, each data relationship including a corresponding open loop phase angle, an open loop gain, and a gain rate, the gain rate being the rate of change of open loop gain per open loop phase angle of the corresponding open loop system response.

36. A system of claim 35 wherein the system further comprises means for storing the data relationships.

37. A method for evaluating the susceptibility of an operator coupling with an operator controlled system, the method comprising:

providing an open loop frequency response for an open loop system having a selected operator gain;

determining if there is at least one operator gain for the open loop system that provides at least one over-steer point, the at least one over-steer point being the condition where, as the operator gain is increased for the open loop system, the corresponding closed loop gain at a corresponding resonance peak increases by at least approximately the same amount as the increase in operator gain or at least approximately a selected larger amount than the increase in operator gain; and if there is at least one over-steer point;

determining an open loop phase angle associated with the at least one over-steer point;

at least one of storing the open loop phase angle, displaying the open loop phase angle, printing the open loop phase angle, and using the open loop phase angle to evaluate the susceptibility of the operator coupling with the operator controlled system.

38. The method of claim 37 wherein the method further comprises:

determining an open loop gain at the at least one over-steer point; and determining an open loop gain of the open loop frequency response at the open loop phase angle associated with the at least one over-steer point.

39. The method of claim 37 wherein:

determining if there is at least one operator gain for the open loop system that provides at least one over-steer point includes determining if there is at least one operator gains for the open loop system that provides at least one over-steer point using a computing system; and determining an open loop phase angle associated with the at least one over-steer point includes determining an open loop phase angle associated with the at least one over-steer point using a computing system.

40. The method of claim 37 wherein the method further comprises:

determining an open loop gain at the at least one over-steer point using a computing system; and determining an open loop gain of the open loop frequency response at the open loop phase angle associated with the at least one over-steer point using a computing system.

41. The method of claim 37 wherein the method further comprises:

determining an open loop gain at the at least one over-steer point;

determining an open loop gain of the open loop frequency response at the open loop phase angle associated with the at least one over-steer point; and comparing the open loop gain at the at least one over-steer point to the open loop gain of the open loop frequency response at the open bop phase angle associated with the at least one over-steer point.

42. The method of claim 37 wherein the method further comprises:

determining an open loop gain of the open loop frequency response at the open loop phase angle associated with the at least one over-steer point;

finding a closed loop gain at the at least one over-steer point;

determining if the closed loop gain at the at least one over-steer point is equal to zero decibels or less than zero decibels; and if so comparing the open loop gain of the open loop frequency response at the at least one open loop phase angle to an open loop gain associated with the combination of the at least one open loop phase angle and a closed loop gain of zero decibels.

43. The method of claim 37 wherein the method further comprises:

determining an open loop gain at the at least one over-steer point;

determining an open loop gain of the open loop frequency response at the open loop phase angle associated with the at least one over-steer point; and computing an over-steer margin for the open loop frequency response at the open loop phase angle associated with the at least one over-steer point by subtracting the open loop gain of the open loop frequency response at the open loop phase angle associated with the at least one over-steer point from the open loop gain at the at least one over-steer point.

44. The method of claim 37 wherein the method further comprises:

determining an open loop gain of the open loop frequency response at the open loop phase angle associated with the at least one over-steer point;

finding a closed loop gain at the at least one over-steer point;

determining if the closed loop gain at the at least one over-steer point is equal to zero decibels or less than zero decibels; and if so computing an over-steer margin for the open loop frequency response at the open loop phase angle associated with the at least one over-steer point by subtracting the open loop gain of the open loop frequency response at the open loop phase angle associated with the at least one over-steer point from an open loop gain associated with the combination of the at least one open loop phase angle and a closed loop gain of zero decibels.

45. The method of claim 37 wherein the method further comprises:
providing a critical gain rate, the critical gain rate being the rate of change of open loop gain per open loop phase angle of an open loop frequency response for an open loop system having an over-steer point with a closed loop gain at least approximately equal to zero decibels;
determining if the open loop frequency response has at least one phase angle where the gain rate of the open loop frequency response is less than the critical gain rate; and if so
finding the at least one open loop phase angle where the gain rate of the open loop frequency response is less than the critical gain rate.

46. The method of claim 37 wherein the method further comprises:
determining an open loop gain of the open loop frequency response at the open loop phase angle associated with the at least one over-steer point;
providing a critical gain rate, the critical gain rate being the rate of change of open loop gain per open loop phase angle of an open loop frequency response for an open loop system having an over-steer point with a closed loop gain at least approximately equal to zero decibels;
determining if the gain rate of the open loop frequency response at the open loop phase angle associated with the at least one over-steer point is equal to the critical gain rate or less than the critical gain rate; and if so
comparing the open loop gain of the open loop frequency at the at least one open loop phase angle to an open loop gain associated with the combination of the at least one open loop phase angle and a closed loop gain of zero decibels.

47. The method of claim 37 wherein the method further comprises:
providing a critical gain rate, the critical gain rate being the rate of change of open loop gain per open loop phase angle of an open loop frequency response for an open loop system having an over-steer point with a closed loop gain at least approximately equal to zero decibels;
determining the open loop gain of an imaginary open loop frequency response at a phase angle of −180 degrees, the imaginary open loop frequency response having a constant gain rate at least approximately equal to the critical rate between an open loop gain of the open loop frequency response at the open loop phase angle associated with the at least one over-steer point and a phase angle of −180 degrees;
finding the open loop gain of the open loop frequency response at a phase angle of −180 degrees; and
comparing the open loop gain of the imaginary open loop frequency response at −180 degrees to the open loop gain of the open loop frequency response at a phase angle of −180 degrees.

48. The method of claim 37 wherein the method further comprises:
providing a critical gain rate, the critical gain rate being the rate of change of open loop gain per open loop phase angle of an open loop frequency response for an open loop system having an over-steer point with a closed loop gain at least approximately equal to zero decibels;
determining the open loop gain of an imaginary open loop frequency response at a phase angle of −180 degrees, the imaginary open loop frequency response having a constant gain rate at least approximately equal to the critical rate between an open loop gain of the open loop frequency response at the open loop phase angle associated with the at least one over-steer point and a phase angle of −180 degrees;
finding the open loop gain of the open loop frequency response at a phase angle of −180 degrees; and
computing a PIO margin, the PIO margin being the open loop gain of the imaginary open loop frequency response at −180 degrees minus the open loop gain of the open loop frequency response at a phase angle of −180 degrees.

49. The method of claim 37 wherein the method further comprises:
finding an open loop gain of the open loop frequency response at the open loop phase angle associated with the at least one over-steer point;
determining an open loop gain of the open loop frequency response at a phase angle of −180 degrees; and
comparing the open loop gain of the open loop frequency at the at least one open loop phase angle and the open loop gain of the open loop frequency response at a phase angle of −180 degrees.

50. The method of claim 37 wherein the method further comprises:
finding an open loop gain of the open loop frequency response at the open loop phase angle associated with the at least one over-steer point;
determining an open loop gain of the open loop frequency response at a phase angle of −180 degrees; and
computing an over-steer to PIO margin by subtracting the open loop gain of the open loop frequency response at a phase angle of −180 degrees from the open loop gain of the open loop frequency response at the at least one open loop phase angle.

51. The method of claim 37 wherein the open loop frequency response includes an open loop frequency response of an aircraft.

52. The method of claim 37 wherein providing an open loop frequency response includes providing a first open loop frequency response, and wherein the method further includes:
providing a critical gain rate, the critical gain rate being the rate of change of open loop gain per open loop phase angle of an open loop frequency response for an open loop system having an over-steer point with a closed loop gain at least approximately equal to zero decibels;
determining the open loop gain of an imaginary open loop frequency response at a phase angle of −180 degrees, the imaginary open loop frequency response having a constant gain rate at least approximately equal to the critical rate between an open loop gain of the first open loop frequency response at the open loop phase angle associated with the at least one over-steer point and a phase angle of −180 degrees;
providing a second open loop frequency response; and
comparing the open loop gain of the imaginary open loop frequency response at a phase angle of −180 degrees to the open loop gain of the second open loop frequency response at a phase angle of −180 degrees.

53. A computer readable medium having contents configured to carry out a method for evaluating the susceptibility of a system to operator coupling, the method comprising:

receiving an open loop frequency response for an open loop system having a selected operator gain;

determining if there is at least one operator gain for the open loop system that provides at least one over-steer point, the over-steer point being the condition where, as the operator gain is increased for the open loop system, a corresponding closed loop gain at a corresponding resonance peak increases by at least approximately the same amount as the increase in operator gain or at least approximately a selected larger amount than the increase in operator gain; and if there is at least one over-steer point; and determining an open loop phase angle associated with the at least one over-steer point.

54. The computer readable medium of claim 53 wherein the method further comprises:

determining an open loop gain at the at least one over-steer point; and determining an open loop gain of the open loop frequency response at the open loop phase angle associated with the at least one over-steer point.

55. The computer readable medium of claim 53 wherein the method further comprises:

determining an open loop gain at the at least one over-steer point;

determining an open loop gain of the open loop frequency response at the open loop phase angle associated with the at least one over-steer point; and comparing the open loop gain at the at least one over-steer point to open loop gain of the open loop frequency response at the open loop phase angle associated with the at least one over-steer point.

56. The computer readable medium of claim 53 wherein the method further comprises:

providing a critical gain rate, the critical gain rate being the rate of change of open loop gain per open loop phase angle of an open loop frequency response for an open loop system having an over-steer point with a closed loop gain at least approximately equal to zero decibels;

determining if the open loop frequency response has at least one phase angle where the gain rate of the open loop frequency response is less than the critical gain rate; and if so finding the at least one open loop phase angle where the gain rate of the open loop frequency response is less than the critical gain rate.

57. The computer readable medium of claim 53 wherein the method further comprises:

determining an open loop gain of the open loop frequency response at the open loop phase angle associated with the at least one over-steer point;

providing a critical gain rate, the critical gain rate being the rate of change of open loop gain per open loop phase angle of an open loop frequency response for an open loop system having an over-steer point with a closed loop gain at least approximately equal to zero decibels;

determining the open loop gain of an imaginary open loop frequency response at a phase angle of −180 degrees, the imaginary open loop frequency response having a constant gain rate at least approximately equal to the critical gain rate between an open loop gain of the open loop frequency response at the open loop phase angle associated with the at least one over-steer point and a phase angle of −180 degrees; finding the open loop gain of the selected open loop frequency response at a phase angle of −180 degrees; and comparing the open loop gain of the imaginary open loop frequency response at −180 degrees to the open loop gain of the selected open loop frequency response at a phase angle of −180 degrees.

58. The computer readable medium of claim 53 wherein the method further comprises:

finding an open loop gain of the open loop frequency response at the open loop phase angle associated with the at least one over-steer point;

determining an open loop gain of the open loop frequency response at a phase angle of −180 degrees; and comparing the open loop gain of the open loop frequency at the at least one open loop phase angle and the open loop gain of the open loop frequency response at a phase angle of −180 degrees.

59. The computer readable medium of claim 53 wherein receiving an open loop frequency response includes receiving a first open loop frequency response, and wherein the method further includes:

determining an open loop gain of the first open loop frequency response at the open loop phase angle associated with the at least one over-steer point;

providing a critical gain rate, the critical gain rate being the rate of change of open loop gain per open loop phase angle of an open loop frequency response for an open loop system having an over-steer point with a closed loop gain at least approximately equal to zero decibels;

determining the open loop gain of an imaginary open loop frequency response at a phase angle of −180 degrees, the imaginary open loop frequency response having a constant gain rate at least approximately equal to the critical gain rate between an open loop gain of the first open loop frequency response at the open loop phase angle associated with the at least one over-steer point and a phase angle of −180 degrees;

providing a second open loop frequency response; and comparing the open loop gain of the imaginary open loop frequency response at a phase angle of −180 degrees to the open loop gain of the second open loop frequency response at a phase angle of −180 degrees.

60. A system for evaluating the susceptibility of a system to operator coupling, the system comprising:

means for receiving an open loop frequency response for an open loop system having a selected operator gain;

means for determining if there is at least one operator gain for the open loop system that provides at least one over-steer point, the over-steer point being the condition where, as the operator gain is increased for the open loop frequency response, the corresponding closed loop gain al a corresponding resonance peak increases by at least approximately the same amount as the increase in operator gain or at least approximately a selected larger amount than the increase in operator gain; and if there is at least one over-steer point; and means for determining an open loop phase angle associated with the at least one over-steer point.

61. The system of claim 60 wherein the system further comprises:

means for determining an open loop gain at the at least one over-steer point; and means for determining an open loop gain of the open loop frequency response at the open loop phase angle associated with the at least one over-steer point.

62. The system of claim 60 wherein the system further comprises:
- means for determining an open loop gain at the at least one over-steer point;
- means for determining an open loop gain of the open loop frequency response at the open loop phase angle associated with the at least one over-steer point; and
- means for comparing the open loop gain at the at least one over-steer point to open loop gain of the open loop frequency response at the open loop phase angle associated with the at least one over-steer point.

63. The system of claim 60 wherein the system further comprises:
- means for providing a critical gain rate, the critical gain rate being the rate of change of open loop gain per open loop phase angle of an open loop frequency response for an open loop system having an over-steer point with a closed loop gain at least approximately equal to zero decibels;
- means for determining if the open loop frequency response has at least one phase angle where the gain rate of the open loop frequency response is less than the critical gain rate; and if so
- means for finding the at least one open loop phase angle where the gain rate of the open loop frequency response is less than the critical gain rate.

64. The system of claim 60 wherein the system further comprises:
- means for determining an open loop gain of the open loop frequency response at the open loop phase angle associated with the at least one over-steer point;
- means for providing a critical gain rate, the critical gain rate being the rate of change of open loop gain per open loop phase angle of an open loop frequency response for an open loop system having an over-steer point with a closed loop gain at least approximately equal to zero decibels;
- means for determining the open loop gain of an imaginary open loop frequency response at a phase angle of −180 degrees, the imaginary open loop frequency response having a constant gain rate at least approximately equal to the critical rate between an open loop gain of the open loop frequency response at the open loop phase angle associated with the at least one over-steer point and a phase angle of −180 degrees;
- means for finding the open loop gain of the selected open loop frequency response at a phase angle of −180 degrees; and means for comparing the open loop gain of the imaginary open loop frequency response at −180 degrees to the open loop gain of the selected open loop frequency response at a phase angle of −180 degrees.

65. The system of claim 60 wherein the system further comprises:
- means for finding an open loop gain of the open loop frequency response at the open loop phase angle associated with the at least one over-steer point;
- means for determining an open loop gain of the open loop frequency response at a phase angle of −180 degrees; and
- means for comparing the open loop gain of the open loop frequency response at the at least one open loop phase angle and the open loop gain of the open loop frequency response at a phase angle of −180 degrees.

66. The system of claim 60 wherein means for receiving an open loop frequency response includes means for receiving a first open loop frequency response, and wherein the system further includes:
- means for determining an open loop gain of the first open loop frequency response at the open loop phase angle associated with the at least one over-steer point;
- means for providing a critical gain rate, the critical gain rate being the rate of change of open loop gain per open loop phase angle of an open loop frequency response for an open loop system having an over-steer point with a closed loop gain at least approximately equal to zero decibels;
- means for determining the open loop gain of an imaginary open loop frequency response at a phase angle of −180 degrees, the imaginary open loop frequency response having a constant gain rate at least approximately equal to the critical rate between an open loop gain of the first open loop frequency response at the open loop phase angle associated with the at least one over-steer point and a phase angle of −180 degrees;
- providing a second open loop frequency response; and
- comparing the open loop gain of the imaginary open loop frequency response at a phase angle of −180 degrees to the open loop gain of the second open loop frequency response at a phase angle of −180 degrees.

* * * * *